US005908898A

United States Patent [19]

Wan-Cheng et al.

[11] Patent Number: 5,908,898

[45] Date of Patent: Jun. 1, 1999

[54] INTRINSICALLY CONDUCTIVE POLYMER BLENDS HAVING A LOW PERCOLATION THRESHOLD

[75] Inventors: Lucy Ka Po Wan-Cheng, Chesterfield, Mo.; Lawrence W. Shacklette, Maplewood, N.J.; Chien-Chung Han, Tainan, Taiwan

[73] Assignee: Monsanto Company, St. Louis, Mo.

[21] Appl. No.: 09/022,420

[22] Filed: Feb. 12, 1998

[51] Int. Cl.[6] .............................. C08F 8/00; C08L 39/04; H01B 1/06

[52] U.S. Cl. .......................... 525/185; 525/186; 525/191; 525/197; 525/203; 525/540; 252/511

[58] Field of Search .................................... 525/185, 186, 525/191, 197, 203, 540; 528/210, 422, 480, 491; 252/500, 510, 511

[56] References Cited

U.S. PATENT DOCUMENTS

| | | | |
|---|---|---|---|
| 4,929,388 | 5/1990 | Wessling . | |
| 4,935,164 | 6/1990 | Wessling et al. . | |
| 5,006,278 | 4/1991 | Elsenbaumer . | |
| 5,217,649 | 6/1993 | Kulkarni et al. . | |
| 5,254,633 | 10/1993 | Han et al. . | |
| 5,290,483 | 3/1994 | Kulkami et al. . | |
| 5,340,499 | 8/1994 | Kärnä et al. . | |
| 5,378,404 | 1/1995 | Han et al. . | |
| 5,491,027 | 2/1996 | Heeger et al. . | |
| 5,520,852 | 5/1996 | Ikkala et al. . | |
| 5,626,795 | 5/1997 | Smith et al. | 252/500 |

FOREIGN PATENT DOCUMENTS

| | | |
|---|---|---|
| 0 582 919 A2 | 2/1994 | European Pat. Off. . |
| WO 96/21694 | 7/1996 | WIPO . |

OTHER PUBLICATIONS

Andreatta et al., Processing Of Conductive Polyaniline–UHMW Polyethylene Blends From Solutions In Non–Polar Solvents, *Synthetic Metals,* 55–57:1017–1022 (1993).

Passiniemi et al., TEM and WAXS Charcterization Of Polyaniline/PP Fibers, *Synthetic Metals,* 84:775–776 (1997).

Pron et al., Flexible, Highly Transparent, And Conductive Polyaniline–Cellulose Acetate Composite Films, *J. Polymer Science,* 63:971–977 (1997).

Shacklette et al., Polyaniline Blends In Thermoplastics, *Synthetic Metals,* 55–57:3532–3537 (1993).

Shacklette et al., Solubility And Dispersion Characteristics Of Polyaniline, *Mat. Res. Soc. Symp. Proc.,* 328:157–166 (1994).

Tanner[a] et al., Conductivity Tailoring Of Blends Of Fusible Polyaniline And Polyolefins By Viscosity Ratio, *Synthetic Metals,* 84:763–764 (1997).

Yang et al., Morphology Of Conductive, Solution–Processed Blends Of Polyaniline And Poly(Methyl Methacrylate), *Synthetic Metals,* 53:293–301 (1993).

*Primary Examiner*—Nathan M. Nutter
*Attorney, Agent, or Firm*—Howell & Haferkamp, L.C.

[57] ABSTRACT

Electrically conductive polymer blends are produced from an insulating thermoplastic polymer phase and a conductivity enhancing composition that forms a continuous conductive phase and includes an intrinsically conductive polymer salt that is incompatible with the thermoplastic polymer, a thermoplastic conductive phase polymer and a plasticizer that is capable of compatibilizing the conductive phase polymer and the intrinsically conductive polymer salt. The intrinsically conductive polymer salt is concentrated in the continuous conductive phase Methods are also provided for the preparation of these conductive polymer blends.

37 Claims, 9 Drawing Sheets

INTRINSICALLY CONDUCTIVE POLYMER BLENDS HAVING A LOW PERCOLATION THRESHOLD

BACKGROUND OF THE INVENTION (1) Field of the Invention

The present invention relates to electrically conductive polymer blends containing a thermoplastic and an intrinsically conductive polymer, and more particularly to electrically conductive polymer blends containing a thermoplastic and an intrinsically conductive polymer that have a low percolation threshold and methods for preparation thereof.

(2) Description of the Related Art

Electrically conductive plastics have promising potential for use in a growing number of commercially important applications. Fibers and films that are electrical conductors or semi-conductors can be used in anti-static fibers and coatings, corrosion resistant paints and coatings, radiation absorbing materials, electrical components such as capacitors, electrodes and battery components and in many other useful articles.

Basically, there are two approaches for producing conductive plastics; one approach involves blending insulating polymers with electrically conductive particles such as carbon black, metal fines or other conductive non-polymeric material. The other approach involves the synthesis of intrinsically conductive polymers (ICP's) such as polyaniline, polypyrrole, polythiophene, or the like, which are polymers that are capable of charge transfer along a system of conjugated double bonds arranged along the polymer backbone.

The use of conductive particulates to increase the conductivity of a polymer is well known in the art and has provided successful products for many applications. However, particulates are rarely compatible with the matrix polymer and very high loading levels are often required to provide electrically conductive pathways through the matrix polymer. The formation of these pathways is referred to as "percolation", and the level of particulate, or conductive additive, at which such pathways are first formed is termed the "percolation point" or "percolation threshold". The critical concentration for percolation is theoretically associated with the point of steepest rise in a plot of the logarithm of conductivity vs. the percentage of loading volume of the conductive material. Particulates that require a high percolation threshold can bleed out of the matrix polymer and contaminate surrounding materials. Moreover, the use of high levels of particulate material often results in a significant reduction in the mechanical strength of the host polymer, making it less suitable for fibers, films, or other applications that require good tensile properties.

Because ICP's are conductive without the addition of such particulates, they potentially have advantages in applications where optical quality of the polymer is important, or where particle-filled polymers can not provide needed levels of conductivity or strength. As used herein, the term "ICP" is meant to include any polymer having a conjugated $\pi$ electron system that is electrically conductive in at least one valence state. It is well known that some ICP's, such as polyaniline, may be reversibly made conductive by the addition or removal of a protonic acid dopant. Addition of an acid dopant to polyaniline, for example, forms the conductive polyaniline salt, while removal of the acid results in the non-conductive base form. When an ICP is referred to as being "conductive", it is meant that it has an electrical conductivity of at least $10^{-8}$ S/cm. An ICP is "non-conductive" if it has an electrical conductivity of less than $10^{-8}$ S/cm.

Despite several advantages over filled polymers, the commercial application of ICP's has been held back because they are characteristically difficult to process due to very limited solubility and lack of fusibility. Also, films and fibers of pure ICP homopolymers are often brittle and lack the tensile properties necessary for forming textiles or rugged coatings. Furthermore, most ICP's are significantly more expensive than conventional commercial bulk thermoplastic polymers.

Many approaches have been tried to improve the mechanical and processing qualities of ICP's while retaining a desirable level of conductivity. An early approach was to form polymer blends of ICP's with insulating thermoplastics in order to obtain materials having tensile properties of the thermoplastic and conductivity of the ICP. However, such materials often had high percolation thresholds and suitable conductivity was not obtained until ICP levels of 15% to 25% or more had been incorporated into the thermoplastic. See, e.g., Andreatta and Smith, *Synth. Met.,* 55–57:1017, 1993.

Blends of polyaniline with insulating thermoplastics were reported by Kulkarni et al., U.S. Pat. No. 5,217,649, wherein an ester-free plasticizer and an acidic surfactant were used to aid in formation of the blend. However, the composition showing the highest conductivity at 5% wt/wt polyaniline in the blend demonstrated a conductivity of only about 2.7$\times 10^{-7}$ S/cm, which is too low for many anti-static applications.

Karna et al. EP 582,919 A2 and Karna et al., U.S. Pat. No. 5,340,499, reported that a conductivity of almost 0.1 S/cm could be obtained in a blend of acrylonitrile-butadiene-styrene (ABS) containing only 2% wt/wt of polyaniline, but only with the inclusion of high levels of a proprietary metal/organic acid dopant-plasticizer. Polyaniline blends were made with polystyrene, polypropylene and polyethylene and, while the blends showed reduced percolation thresholds over earlier blends, all had high levels of the metal/organic acid dopant complex. The requirement for such high levels of this expensive dopant would increase the cost for such blends.

Another approach to reduce the amount of ICP necessary to give a polymer blend a certain level of conductivity has been to produce materials having the ICP concentrated in a network, or in highly conductive fibrils, to provide a highly conductive pathway for charge transfer through the polyblend.

Wessling, in U.S. Pat. No. 4,929,388, taught the formation of conductive polymer blends containing two partially compatible thermoplastic polymers. An electrically conductive substance, such as carbon black, was loaded into one of the polymers, and the polymers were blended at increased temperature. It was found that if the two polymers had different melt viscosities and different solubility parameters, the polymer having the lower melt viscosity would form a continuous phase through the blend. Carbon black, loaded into the continuous phase polymer of a polyblend was believed to form a conductive network. The reference also reported that ICP's could be used as the conductive substance But, it was said to be preferable to add a crosslinking agent to the blend to physically stabilize the structure of the conductive network.

The production of blends of thermoplastics with ICP's that were formed by mixing solutions of the two polymers in different solvents was reported by Yang et al., in *Synth. Met.,* 53:293–301, 1993. A structure in which the ICP formed a network through the thermoplastic could be produced by controlling the relative miscibility of the respective solvents. Electrical conductivity at an ICP level of under 1% was reported, but the items fabricated were limited to films from which the solvents could be easily evaporated.

Shacklette et al., in *Synth. Met.,* 55–57:3532, 1993, reported percolation thresholds of about 5%–6% by volume for polyaniline (Versicon®) in polycaprolactone or poly (ethyleneterephthalate glycol) blends. They reasoned that these percolation thresholds were lower than that predicted theoretically for a dispersion of small spheres in a matrix polymer (15%–30% by vol.) because the lack of compatibility between the polyaniline and the matrix polymer caused the dispersed polyaniline particles to reagglomerate to form one and two dimensional aggregated structures of high conductivity through the bulk matrix polymer. However, no methods for obtaining predictable formation or maintenance of such structures was disclosed or suggested.

Conn et al., WO 96/21694, reported on the production of composite materials from insulating thermoplastic polymer particles which had been coated with conducting polymers. The coated particles were then thermally bonded into a composite in which the conducting polymer formed a conductive network through the composite. The composites were reported to have conductivities of up to about 30 S/cm and percolation thresholds of less than 1% of the conducting polymer. However, production of commercially useful fibers or films from such composites does not appear promising since the mechanical properties of the conducting composites were significantly reduced from those of the parent thermoplastic polymer. In addition, mixing of the thermoplastic at a temperature exceeding its flowpoint resulted in destruction of the network morphology of the conducting polymer.

Han et al., U.S. Pat. No. 5,378,404, described a method for forming dispersions of ICP's in a matrix polymer wherein an ICP that is incompatible with the matrix polymer is selected. As used in the patent, "incompatible" meant that the ICP and the matrix polymer had different solubility parameters and surface energies; were apt to be chemically reactive with each other; or had mismatched dispersive, polar or hydrogen bonding interactions. The ICP was then doped with a dopant acid which made the ICP more compatible with the matrix polymer. The doped ICP was blended with the matrix polymer to give an electrically conductive blend. The percolation point in a blend with polycaprolactone was about 8% and was from about 6% to 25% in blends with poly(ethyleneterephthalate glycol).

It has also been suggested by Shacklette that conductive blends could be made from a polar ICP (e.g., Versicon®) mixed with a partially compatible polymer such as ethyl vinyl acetate and that the percolation threshold of such blends could be reduced further by the addition of polar plasticizers.

Heeger et al., U.S. Pat. No. 5,491,027, produced microfibrils containing high levels of ICP's and then blended the microfibrils into polyethylene. Although the microfibrils themselves had high conductivities, the conductivity of the blends, even at about 20% ICP content, was around $10^{-8}$ to $10^{-10}$ S/cm. Later, Passiniemi et al., in *Synth. Met.,* 84:775–776, 1997, reported that fibers were melt spun from a blend of polypropylene and polyaniline doped with a proprietary dopant/plasticizer. The fibers had conductivities of about $10^{-3}$ S/cm. The polyaniline was reported to have formed discrete fibrils within the polypropylene fiber matrix and the fibrils were mainly oriented along the fiber direction.

Tanner et al., in *Synth. Met.,* 84:763–764, 1997, reported blends of polypropylene with doped polyaniline to which an ampiphilic plasticizer had been added. It was thought that the use of an ampiphilic dopant, such as dodecylbenzenesulfonic acid and an ampiphilic plasticizer resulted in the formation of a network structure in which the polyaniline formed a continuous phase if the polyaniline phase had a lower melt viscosity than the matrix polymer and that the matrix polymer be nonpolar in nature. However, the conductivity of such blends was about $10^{-3}$ S/cm at 15% polyaniline complex in the blend and the percolation point was not given. Plasticizers were also used in blends of polyaniline and cellulose acetate by Pron et al. as reported in *J. Appl. Polym. Sci.,* 63:971–977, 1997. A blend of doped polyaniline, a plasticizer composition containing dimethyl phthalate, diethyl phthalate and triphenyl phosphate, and cellulose acetate was formed as a film deposited from a solution in m-cresol. The film was reported to have a percolation threshold of 0.05% based on the weight of emeraldine base in the blend. This low percolation point was reported to be due to a unidimensional aggregation of polyaniline grains in the blend. Such fabrication techniques, however, would be limited to thin films and other thin materials that could be formed by solvent evaporation.

Despite the promising results that have been obtained by the use of network structures in polymer blends to reduce the level of ICP necessary for a given level of conductivity, some problems still remain before such compositions find broad commercial success. In particular, methods must be found that result in stable and reproducible network structures having low percolation thresholds while maintaining commercially useful tensile properties.

It would, therefore, be advantageous to provide a blend of a thermoplastic and an ICP where the blend has a low percolation threshold and significant electrical conductivity at low levels of the ICP. Furthermore, it would be an advantage to provide a simple method for producing such polymer blends having a low percolation threshold. Moreover, it would be advantageous to provide such thermoplastic polymer/ICP blends that have mechanical properties that are suitable for applications such as textile fibers and to provide blends that can be processed by conventional processing methods into articles of a variety of shapes and sizes not limited to thin films or the like.

SUMMARY OF THE INVENTION

Briefly, therefore, the present invention is directed to a multiple phase electrically conductive polymer blend, comprising an electrically insulative thermoplastic matrix polymer dispersed through a continuous conductive phase that includes an intrinsically conductive polymer salt that is incompatible with the matrix polymer, a thermoplastic conductive phase polymer that is partially compatible with both the intrinsically conductive polymer salt and the matrix polymer and a plasticizer that is capable of compatibilizing the conductive phase polymer and the intrinsically conductive polymer salt, wherein the intrinsically conductive polymer salt is concentrated in the conductive phase.

The present invention also provides a method for preparation of a multiple phase electrically conductive polymer blend wherein an electrically insulative thermoplastic matrix polymer phase is dispersed through a continuous conductive phase of a conductivity enhancing composition, the method comprising blending the conductivity enhancing composition with an electrically insulative thermoplastic matrix polymer of about equal or higher viscosity, the conductivity enhancing composition comprising (i) an intrinsically conductive polymer salt that is incompatible with the matrix polymer and has an affinity for the conductivity enhancing composition relative to the matrix polymer, (ii) a thermoplastic conductive phase polymer that is partially compatible with both the matrix polymer and the intrinsically conductive polymer salt, and (iii) a plasticizer that is at least partially compatible with the conductive phase polymer and the intrinsically conductive polymer salt, thereby to form a multiple phase electrically conductive polymer blend wherein the matrix polymer phase is dispersed through a continuous conductive phase of the conductivity enhancing composition.

Among the several advantages found to be achieved by the present invention, therefore, may be noted the provision of electrically conductive blends of a thermoplastic polymer and an ICP that have a low percolation threshold and have significant electrical conductivity at low levels of the ICP; the provision of a simple method for producing such polymer blends having a low percolation threshold; and the provision of such thermoplastic polymer blends having mechanical properties that are similar to those of the undiluted thermoplastic and blends that can be processed by conventional processing methods into articles of a variety of shapes and sizes not limited to thin films or the like.

DETAILED DESCRIPTION OF THE PREFERRED EMBODIMENTS

Figure 1:
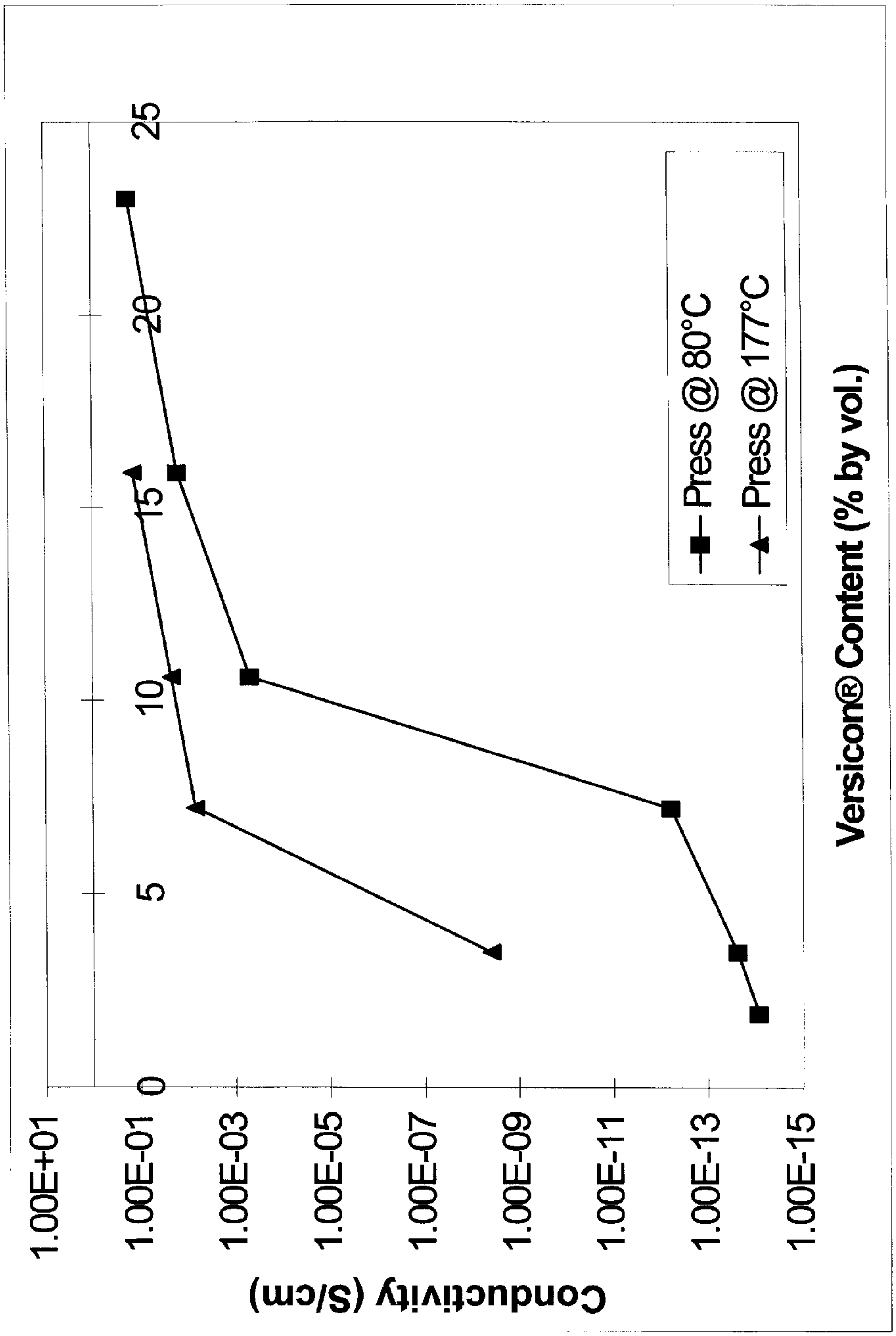
FIG. 1 is a plot of electrical conductivity of a film pressed from a blend of ICP salt (Versicon®) with ethyl(vinyl acetate) copolymer and low levels of tris(2-butoxyethyl) phosphate and ethylene carbonate as a function of the level of ICP salt in the blend.

In accordance with the present invention, it has been discovered that a multiple phase electrically conductive polymer blend can be produced by mixing an organic acid salt of an intrinsically conductive polymer ("ICP salt") with a conductive phase polymer and a plasticizer to form a conductivity enhancing composition and mixing the conductivity enhancing composition with an insulating thermoplastic polymer ("matrix polymer") to produce a multiple phase polymer blend having a low percolation threshold and wherein the ICP salt is concentrated in a continuous conductive phase. It has been found that if the ICP salt is selected to be incompatible with the matrix polymer, the conductive phase polymer is partially compatible with the ICP salt and the matrix polymer, and the plasticizer is at least partially compatible with the ICP salt and the conductive phase polymer, the ICP salt has an affinity for the continuous conductive phase, resulting in a concentration of the ICP salt in the conductive phase and minimizing the amount in the matrix polymer phase. The presence of the ICP salt in the conductive phase has been found to be sufficient to impart a desirable level of conductivity to the blend as long as the conductive phase exists as a continuous phase in the polymer blend. Because it has been found that the presence of ICP salt in the matrix polymer is unnecessary, it has been discovered that the concentration of ICP salt in the conductive phase by virtue of its affinity therefor reduces the waste of ICP salt in the matrix polymer and so increases the efficiency of the ICP salt in the blend. Accordingly, a polymer blend having a low percolation threshold is produced.

One advantage of such thermoplastic blends is that they have sufficient electrical conductivity to be useful in antistatic applications and semi-conductor applications at economically low levels of ICP salt. In fact, blends having conductivities of over $10^{-3}$ S/cm can be produced at levels of ICP salt of about 3.5% by vol. Obtaining significant electrical conductivity at low levels of ICP also permits articles produced from the blends to retain much the same mechanical properties as the matrix polymers themselves and the tensile strength of the blends is not significantly weakened by inclusion of weak or brittle ICP's. Moreover, since the blends may be produced without dissolving any of the components in a solvent and subsequently evaporating the solvent, articles may be produced that are not limited to thin films and fibers, but include articles normally produced by molding and other conventional thermoplastic polymer processing techniques.

The Thermoplastic Matrix Polymer

As noted, one component of the conductive thermoplastic polymer blend of the present invention is an insulative thermoplastic matrix polymer. The matrix polymer may be almost any thermoplastic, but is preferably an insulative polymer. The term "insulative" is used herein to mean a polymer having an electrical conductivity lower than about $10^{-12}$ S/cm. The matrix polymer may be a pure homopolymer, a copolymer, or a mixture or blend of two or more thermoplastic polymers.

The matrix polymer can also contain other materials such as pigments, surfactants, plasticizers and the like.

Preferred matrix polymers have a softening temperature no higher than about 300° C., more preferably no higher than about 275° C., and most preferably no higher than about 250° C. In general, it is preferable that the matrix polymer have a softening temperature that is sufficiently low that the blend can be processed at a temperature that will result in the retention of electrical conductivity of the ICP salt. In those embodiments where the polymer blend is to be used to form textile fibers or articles requiring similar tensile properties, it is preferred that the matrix polymer have tensile properties suitable for the fabrication of textile fibers.

The thermoplastic matrix polymer can be either polar or non-polar. Indeed, it can have any polarity. The polarity of the matrix polymer can be expressed by any parameter that is used for such measurement, such as, for example, surface tension, dielectric constant, solubility parameter, or any other suitable parameter that is well known in the art for the measurement of the relative polarity of a polymer. Shacklette and Han, *Mat. Res. Soc. Symp. Proc.,* 328:157–166, 1994, which is incorporated by reference herein, discuss the use of solubility parameter and surface tension as parameters for the measurement of the polarity of polymers and solvents. By way of example, some polar matrix polymers and their respective surface tension values are nylon 6 (42 dynes/cm or milliNewtons/meter (mN/m)), polyvinylchloride (39 mN/m), polymethylmethacrylate (39 mN/m) and polyethylenetherephthalate (43 mN/m). Other matrix polymers, such as, for example, teflon (20 mN/m), polystyrene (33 mN/m), and low density polyethylene (31 mN/m) are considered to be non-polar in character.

Thermoplastic polymers that are suitable for use in this invention can vary widely. Illustrative of such polymers are polyesters such as polyglycolic acid, polyethylene succinate, polyethylene adipate, polytetramethylene adipate, polyethylene azelate, polyethylene sebecate, polydecamethylene adipate, polydecamethylene sebacate, poly-α,α-dimethylpropiolactone, polypivaloyl lactone, polyparahydroxybenzoate, polyethylene oxybenzoate, polyethylene isophthalate, polyethylene terephthalate, polydecamethylene terephthalate, polyhexamethylene terephthalate, poly-1,4-cyclohexane dimethylene terephthalate, polyethylene-1,5-naphthalate, polyethylene-2,6-naphthalate, poly-1,4-cyclohexylidene dimethyleneterephthalate and the like; polyamides such as poly-4-aminobutyric acid, poly-6-aminohexanoic acid, poly-7-aminoheptanioc acid, poly-8-aminooctanoic acid, poly-9-aminonanonoic acid, poly-10-aminodecanoic acid, poly-11-aminoundecanoic acid, poly-12-aminododecanoic acid, polyhexamethyleneadipamide, polyheptamethylene pimelamide, polyoctamethylene suberamide, polyhexamethylene sebacamide, polynanomethylene azelamide, polydecamethylene azelamide, polydecamethylene sebacamide, poly-bis-4-aminocyclohexyl-methane-1,10-decanedicarboxamide, poly-m-xylene-adipamide, poly-p-xylene-sebacamide, poly-2,2,2-trimethylhexamethylene terephthalamide, polypiperazine sebacamide, polymetaphenylene isophthalamide, poly-p-phenylene terephthalamide, and the like; polycarbonates such as polymethane bis-4-phenyl carbonate, poly-1,1-ethane bis-4-phenyl carbonate, poly-2,2-propane bis-4-phenyl carbonate, poly-2,2-propane bis-4-phenylcarbonate, poly-1,1-butane bis-4-phenyl carbonate, poly-1,1,2-methyl propane bis-4-phenyl carbonate, poly-2,2-butane bis-4-phenylcarbonate, poly-2,2-pentane bis-4-phenylcarbonate, poly-4,4-heptane bis-4-phenylcarbonate, poly-1,1-1-phenylethane bis-4-phenylcarbonate, polydiphenylmethane bis-4-phenylcarbonate, poly-1-cyclopentane bis-4-phenylcarbonate, poly-1,1-cyclohexane bis-4-phenylcarbonate, polythio bis-4-phenylcarbonate, poly-2,2-propane bis-4-2-methylphenylcarbonate, poly-2,2-propane bis-4-2-chlorophenylcarbonate, poly-2,2-propane bis-4-2,6-dichlorophenylcarbonate, poly-2,2-propane bis-4-2,6-dibromophenylcarbonate, poly-1,1-cyclohexane bis-4-2,6-dichlorophenylcarbonate, and the like; polymers derived from the polymerization of a, β-unsaturated monomers such as polyethylene, acrylonitrile/butadiene/styrene terpolymer, polypropylene, poly-1-butene, poly-3-methyl-1-butene, poly-1-pentene, poly-4-methyl-1-pentene, poly-1-hexene, poly-5-methyl-1-hexene, poly-1-octadecene, polyisobutylene, polyisoprene, 1,2-poly-1,3-butadiene(iso), 1,2-poly-1,3-butadiene(syndio), polystyrene, poly-a-methylstyrene, poly-2-methylstyrene, poly-4-methylstyrene, poly-4-methoxystyrene, poly-4-phenylstyrene, poly-3-phenyl-1-propene, poly-2-chlorostyrene, poly-4-chlorostyrene, polyvinyl fluoride, polyvinyl chloride, polyvinyl bromide, polyvinylidene fluoride, polyvinylidene chloride, polytetrafluoroethylene, polychlorotrifluoroethylene, polyvinylcyclopentane, polyvinylcyclohexane, poly-α-vinylnaphthalene, polyvinyl alcohol, polyvinylmethyl ether, polyvinyl ethyl ether, polyvinyl propyl ether, polyvinyl isopropyl ether, polyvinyl butyl ether, polyvinyl isobutyl ether, polyvinyl sec.-buty ether, polyvinyl tert.-butyl ether, polyvinyl hexyl ether, polyvinyl octyl ether, polyvinyl methyl ketone, polymethyl isopropenyl ketone, polyvinyl formate, polyvinyl acetate, polyvinyl propionate, polyvinyl chloroacetate, polyvinyl trifluoroacetate, polyvinyl benzoate, poly-2-vinylpyridine, polyvinylpyrrolidone, polyvinylcarbazole, polyacrylic acid, polymethyl acrylate, polyethyl acrylate, polypropyl acrylate, polyisopropyl acrylate, polybutyl acrylate, polyisobutyl acrylate, polysec.-butyl acrylate, polytert.-butyl acrylate, polymethacrylic acid, polymethyl methacrylate, polyethyl methacrylate, polypropyl methacrylate, polyisopropyl methacrylate, polybutyl methacrylate, polyisobutyl methacrylate, polysec.-butyl methacrylate, polytert.-butyl methacrylate, poly-2-ethylbutyl methacrylate, polyhexyl methacrylate, polyoctyl methacrylate, polydodecyl methacrylate, polyoctadecyl methacrylate, polyphenyl methacrylate, polybenzyl methacrylate, polycyclohexyl methacrylate, polymethyl chloroacrylate, polyacrylonitrile, polymethacrylonitrile, polyacrylamide, poly N-isopropylacrylamide, and the like; polydienes such as poly-1,3-butadiene(cis), poly-1,3-butadiene(trans), poly-1,3-butadiene(mixt.), poly-1,3-pentadiene(trans), poly-2-methyl-1-1,3-butadiene(cis), poly 2-methyl-1,3-butadiene (trans), poly-2-methyl-1,3-butadiene(mixt.), poly-2-tert.-butyl-1-1,3-butadiene(cis), poly-2-chloro-1,3-butadiene (trans), poly2-chloro-1,3-butadiene(mixt.) and the like; polyoxides such as polymethylene oxide, polyethylene oxide, polytetramethylene oxide, polyethylene formal, polytetramethylene formal, polyacetaldehyde, polypropylene oxide, polyhexene oxide, polyoctene oxide, polytrans-2-butene oxide, polystyrene oxide, poly-3-methoxypropylene oxide, poly-3-butoxypropylene oxide, poly-3-hexoxypropylene oxide, poly-3-phenoxypropylene oxide, poly-3-chloropropylene oxide, poly-2,2-bischloromethyl-trimethylene-3-oxide, poly-2,6-dimethyl1,4-phenylene oxide, PPO, poly-2,6-diphenyl-1,4-phenylene oxide, and the like, polysulphides such as polypropylene sulphide, polyphenylene sulphide and the like; polysulfones such as poly-4,4'-isopropylidene diphenoxydi-4-phenylene sulphone; noryl, and the like, and/or mixtures thereof.

Preferred for use in the present invention are thermoplastics such as polyethylene, polypropylene, acrylonitrile/butadiene/styrene terpolymer and nylons.

It should be understood that while the matrix polymer of this invention is described in terms of a thermoplastic, the same concept can be applied when the matrix polymer is a thermoset polymer. Therefore, epoxy resins, urea-formaldehyde resins and other thermoset polymers can act as the matrix polymer provided that they possess the characteristics of the matrix polymer as described above.

To produce the conductive polymer blend of the present invention, the matrix polymer is blended with a conductivity enhancing composition that comprises at least an ICP salt, a conductive phase polymer and a plasticizer.

The Intrinsically Conductive Polymer Salt

The ICP salt includes any protonic acid salt of an ICP. Such ICP's as polyaniline, polypyrrole and polythiophene form salts with protonic acid dopants and such ICP salts usually have electrical conductivities that are higher than the conductivity of the base form of the ICP. Such ICP's and their salts are well known in the art and a comprehensive summary of ICP technology can be found in *Synthetic Metals,* vols. 17–19, 1987; vols. 28–30, 1989; and vols. 40–42, 1991, incorporated by reference herein. Pure forms of the ICP salts of the present invention preferably have electrical conductivities that are equal to or higher than about $10^{-4}$ S/cm, more preferably, equal to or higher than about $10^{-2}$ S/cm and most preferably equal to or higher than about 1 S/cm.

It is preferred that the ICP salt be compatible with and have an affinity for the conductivity enhancing composition and be incompatible with the matrix polymer. Without wishing to be bound by this or any other theory, the subject inventors believe that this combination of properties inhibits dispersion of the ICP salt into the matrix polymer phase upon blending the conductivity enhancing composition therewith; that is, it increases the retention of the ICP salt in the conductive phase of the polymer blend. Retention of the ICP salt in the conductive phase of the blend permits the use of higher concentrations of ICP salt in that phase without the loss of the ICP into the matrix polymer phase during or after blending. This property results in higher conductivity for the blend at lower overall levels of the ICP salt in the blend, thus providing a lower percolation threshold.

As used herein, "compatibility" refers to the ability of two or more materials to exist in close and permanent association indefinitely. Materials are compatible if they can exist in intimate contact for long periods with no adverse effect of one on the other. Compatibility between polymers, or between polymers and plasticizers, is related to the ability of one material to mix intimately with another. In general, materials that have similar polarities are compatible, while materials having dissimilar polarities are incompatible. Several quantitative parameters, such as dielectric constant, solubility parameter, Hanson and Hildebrandt parameters, and surface tension, have been shown to be proportional to polarity and are well known to persons skilled in the art of polymer blending and are described in such references as U.S. Pat. Nos. 5,217,649 and 5,378,404. Further information about the calculation of solubility parameters and other pertinent polarity parameters for organic materials is also presented in references such as the *Handbook of Chemistry and Physics,* CRC Press, 56th Ed., pp.C-720 et seq., 1975–1976; the *Handbook of Solubility Parameters and Other Cohesion Parameters,* 2nd Ed., A. F. M. Barton, CRC Press, 1991, and *Polymer Handbook,* J. Brandrup and E. H. Immergut, Eds., John Wiley & Sons, 1989.

Thus, as used herein, the term "compatibility" refers to the extent that two polymers, or a polymer and a plasticizer, are physically and chemically compatible and two materials are deemed to be "compatible" if they meet one or more of the following criteria: the materials have closely matching solubility parameters and/or surface energies; have low chemical reactivity with each other; and have matching dispersive, polar or hydrogen bonding interactions which lead to the ready dispersion of one material in the other. More specifically, as used herein, one material is deemed to be compatible with a second material if its surface energy value is within about 6 mN/m units of the surface energy value of the second material. It is preferable that the surface energy values of compatible materials be within about 5 mN/m of each other, more preferably within about 4 mN/m and most preferably within about 2 mN/m. By way of example, a material having a surface energy of 31 mN/m would be compatible with a second material having a surface energy of between 25 mN/m and 37 mN/m.

The extent of compatibility between polymers can also be estimated by determination of the minimum average particle size achievable in a dispersion of one polymer in the other. A small average particle size, e.g. equal to or less than 100 nanometers, is indicative of relative compatibility As used herein, "incompatible" is the opposite of compatible and refers to two materials having mismatched solubility parameters or surface energies, forming a mixture having relatively large particles even after thorough blending, or being reactive with each other. More specifically, as used herein, one material is deemed to be incompatible with a second material if its surface energy value differs from the surface energy value of the second material by at least about 6 mN/m units. It is preferable that the surface energy values of two incompatible materials differ by at least about 7 mN/m, more preferably that they differ by at least about 8 mN/m and most preferably differ by at least about 10 mN/m. By way of example, a material having a surface energy of 31 mN/m would be incompatible with a second material having a surface energy of less than about 25 mN/m, or greater than about 37 mN/m.

The term "partially compatible", as used herein, means that a material possesses some characteristics that are compatible with another material and other characteristics that are incompatible with such other material. For example, a polymer or plasticizer having both polar and non-polar portions would be considered to be partially compatible with both a polar material and a non-polar material. Also, a polymer or plasticizer having a value of surface tension or solubility parameter that lies between the values of the same parameter for two other materials would be considered to be partially compatible with both of the other materials.

As used herein, a polymer, plasticizer, or polymeric composition in a mixture having two or more phases is said to have an "affinity" for a phase if it is compatible with that phase, or if it is more compatible with that phase than with another phase that is also present in the composition. A polymer, plasticizer, or polymeric composition that is incompatible with a phase does not have an affinity for that phase.

The ICP salt may be doped with almost any protonic acid, but organic acids are preferred dopants. Carboxylic acids, sulfonic acids, sulfinic acids, phosphinic acids, phosphonic acids and mixtures of such acids can be used as dopant acids. Preferred dopant acids are sulfonic acids.

The counter-ion (anion) of the acid dopant used to form the ICP salt can effect the compatibility characteristics of the ICP salt. For example, an ICP doped with an acid having a polar counterion, such as polyaniline doped with hydrochloric acid, has been reported to have a surface tension of about 69.4 mN/m. (See, e.g., Shacklette, L. W. and C. C. Han, *Solubility and dispersion characteristics of polyaniline,* in *Mat. Res. Soc. Symp. Proc., Vol.* 328, pp. 157–166, 1994). Where the counter-ion is a polar organic acid, such as p-toluenesulfonic acid, the polyaniline doped with PTSA has a surface tension of about 49 mN/m. Such polar ICP salts are incompatible with a non-polar matrix polymer such as polyethylene (surface tension=31 mN/m), polystyrene, or polypropylene. On the other hand, an ICP doped with a less polar acid dopant, such as polyaniline doped with dinonylnaphthalenesulfonic acid, which has a surface tension of about 27–30 mN/m, would be compatible with the non-polar polymers just mentioned, but is incompatible with polar polymers such as nylon (surface tension=42 mN/m).

If the matrix polymer of the present invention is a non-polar polymer such as polyethylene, polystyrene, polypropylene, or the like, ICP salts of such polar organic acids as p-toluenesulfonic acid, methyl sulfonic acid, trifluroacetic acid and the like are preferred. More preferred are the polar sulfonic acid salts of polyaniline, polypyrrole or polythiophene. Even more preferred are the polar sulfonic acid salts of polyaniline such as the p-toluenesulfonic acid, or naphthalenesulfonic acid salts of polyaniline. Most preferred is the p-toluenesulfonic acid salt of polyaniline.

If the matrix polymer is a polar polymer such as nylon, polyvinylchloride, polyethyleneterephthalate, or the like, preferred ICP salts are ICP salts of such non-polar organic acids as dinonylnaphthalenesulfonic acid, lauric acid, docosanoic acid, stearic acid, 1-tetradecanesulfonic acid and the like. More preferred are the non-polar organic acid salts of polyaniline, polypyrrole or polythiophene. Even more preferred is the dinonylnaphthalenesulfonic acid salt of polyaniline. One example of a preferred ICP salt that is incompatible with polar polymers is the highly organically soluble dinonylnaphthalenesulfonic acid salt of polyaniline as produced by the emulsion polymerization method disclosed is U.S. Pat. No. 5,567,356, which is incorporated herein by reference.

ICP's, and polyanilines in particular, that are useful in this invention can be prepared by any suitable method. For example, polyaniline may be synthesized by chemical polymerization of substituted or unsubstituted aniline from aqueous solutions or mixed aqueous and organic solutions or emulsions, or by electrochemical polymerization in solutions or emulsions. The polymerization may be carried out in the presence of a dopant, or the polymer may be doped or the dopant exchanged after synthesis to form the ICP salt.

It is not necessary that the ICP salt be of any particular molecular weight and ICP salts can be used in solid or liquid form and with or without the presence of other solvents and accompanying chemicals as long as they can be mixed with the conductive phase polymer and a plasticizer to form the conductivity enhancing composition.

The Conductive Phase Polymer

The "conductive phase polymer" of the present invention is a thermoplastic polymer that is partially compatible with the matrix polymer and is also partially compatible with the ICP salt. In accordance with the definition of "partial compatibility" discussed above, when it is said that the conductive phase polymer is partially compatible with another polymer, it is meant that the conductive phase polymer has at least some of the compatibility characteristics described above that tend to make it compatible with such other polymer, but also has compatibility characteristics that tend to make it incompatible with the other polymer. Thus, a conductive phase polymer having both polar and non-polar characteristics would be partially compatible with a non-polar matrix polymer and also with a polar ICP salt. A conductive phase polymer having a value of surface tension or solubility parameter between the value of the same parameter for the matrix polymer and the ICP salt is partially compatible with both the matrix polymer and the ICP salt.

Because the conductive phase polymer is partially compatible with the matrix polymer and also with the ICP salt, it serves as a compatibilizer between these two components. For example, when the matrix polymer is non-polar, a polar ICP salt is selected and a conductive phase polymer is selected that is partially compatible with both polymers. For such a system it has been found that ethyl(vinyl acetate) copolymer (EVA), ethylene methacrylate (EMA) and maleated polypropylene (MPP) are preferred conductive phase polymers. Furthermore, it has been found that by varying the ratio of ethylene versus vinyl acetate monomer units in the EVA, the relative compatibility of the copolymer with the ICP salt and the matrix polymer can be controlled and an optimum ratio of ethylene to vinyl acetate can easily be found for the particular ICP salt and matrix polymer being used. For example, when ethyl(vinyl acetate) copolymer is used as the conductive phase polymer with a non-polar matrix polymer such as polyethylene, it is preferred that at least about 10% of the monomer units of the copolymer comprise vinyl acetate units and it is more preferable that at least about 20% of the monomer units of the copolymer comprise vinyl acetate units. The same principal works for the MPP by variation of the relative number of substituent (polar) maleate groups added to the (non-polar) polypropylene.

The Plasticizer

The plasticizer of the present invention is an organic compound that is added to the conductivity enhancing composition both to facilitate processing and to increase the flexibility and toughness of the final product by internal modification (salvation) of the ICP salt and the conductive phase polymer. Preferred plasticizers are at least partially compatible with both the ICP salt and with the conductive phase polymer. More preferred plasticizers are compatible with the ICP salt and at least partially compatible with the conductive phase polymer.

Without wishing to be bound to this or any other theory, the inventors believe that the preferred plasticizer further compatibilizes the ICP salt and the conductive phase polymer by replacing some of the secondary valence bonds in each polymer with plasticizer-polymer bonds. This property of the plasticizer effectively increases the affinity of the ICP salt for the conductive phase polymer and thereby increases the affinity of the ICP salt for the conductivity enhancing composition and, thus, the conductive phase of the polymer blend.

When polar ICP salts are used (e.g., with non-polar matrix polymers), the preferred plasticizer is one that is compatible, or at least partially compatible, with the ICP salt. Preferred plasticizers for use with polar ICP salts are mono- and bis-sulfonamides, ethylene carbonate and polar phosphates.

A few illustrative mono-sulfonamides that are suitable for use in the invention include N-methyl-benzenesulfonamide, N-ethyl-benzenesulfonamide, N-butyl-benzenesulfonamide, N-octyl-benzenesulfonamide, N-decyl-benzenesulfonamide, N-dodecy-lbenzenesulfonamide, Nisopropyl-benzenesulfonamide, N-pentyl-benzenesulfonamide, N-heptyl-benzenesulfonamide, N-nonyl-benzenesulfonamide, N-undecyl-toluenesulfonamide, N-cyclohexyl-benzenesulfonamide, N-cyclooctyl-xylenesulfonamide, N-phenyl-benzenesulfonamide, N-phenyl-trimethylbenzenesulfonamide, N-tolyl-butylbenzenesulfonamide, N-phenyl-phenylbenzenesulfonamide, N-biphenyl-xylenesulfonamide, N-1-naphthyl-benzenesulfonamide, N-1-tetrahydronaphthyl-benzenesulfonamide, N-9-anthracenyl-benzenesulfonamide, N-propyl-benzenesulfonamide, N-hexyl-benzenesulfonamide, N-tert-butyl-benzenesulfonamide, N-triphenyl-benzenesulfonamide, N-cyclohexyl-toluenesulfonamide, N,N-dimethyl-benzenesulfonamide, N,N-dibutyl-benzenesulfonamide, N-methyl-N-octyl-benzenesulfonamide, N,N-diphenyl-benzenesulfonamide, N,N-dicyclohexyl-benzenesulfonamide, N,N-diphenyl-xylenesulfonamide, N-cyclopentyl-N-octyl-phenylcarbinylbenzenesulfonamide, N,N-dinonyl-benzenesulfonamide, N-methyl-N-1,2,3,4-tetrahydro-1-naphthyl-benzenesulfonamide, and o,p-Nethyl-p-toluenesulfonamide. Of these mono-sulfonamide plasticizers, N-butyl-benzenesulfonamide and o,p-N-ethyl-p-toluenesulfonamide are preferred.

A few illustrative bis-sulfonamide plasticizers useful in the practice of this invention include N,N'-p-cyclohexylenebis(benzenesulfonamide), N,N'-o-phenylenebis(benzenesulfonamide), N,N'-pphenylenebis (benzenesulfonamide), N,N'- hexamethylenebis (benzenesulfonamide), N,N'-ethylenebis (benzenesulfonamide) and N,N'-pphenylenebis (benzenesulfonamide).

More preferred plasticizers for use with polar ICP salts are n-butyl benzene sulfonamide, n-butyl toluene sulfonamide, n-ethyl toluene sulfonamide, other polar sulfonamides, ethylene carbonate and tris-butoxyethyl phosphate. The most preferred plasticizer for use with polar ICP salts is tris-butoxyethyl phosphate. Such plasticizers can be used alone or in combination. For example, a combination of ethylene carbonate and trisbutoxyethyl phosphate provides superior performance when used with a polar ICP salt such as Versicon®.

When non-polar ICP salts are used (e.g., with polar matrix polymers), the preferred plasticizer is at least partially compatible with the non-polar ICP salt and also with the conductive phase polymer. More preferred plasticizers for non-polar ICP salts are compatible with the ICP salt and partially compatible with the conductive phase polymer.

Illustrative of some non-polar plasticizers that are useful when a non-polar ICP salt is used are non-polar aromatic and aliphatic compounds, which may be substituted or unsubstituted. Such non-polar aromatics and aliphatics preferably have at least 12 carbon atoms. Examples of non-polar aromatic plasticizers are multiplering aromatics, such as naphthalene, phenanthrene, and the like. Some examples of non-polar aliphatic plasticizers are paraffinic waxes and oils having 12 or more carbon atoms, such as dodecane, tetradecane, hexadecane, and the like, and chlorinated paraffins having 12 or more carbon atoms.

It is to be understood that the plasticizer used in the invention does not have to be either "polar", or "non-polar", and can be composed of one or more different compounds However, the plasticizer, must simply have suitable polarity characteristics as to meet the compatibility requirements described above.

The Conductivity Enhancing Composition

The conductivity enhancing composition contains at least the ICP salt and the conductive phase polymer and preferably also contains a plasticizer. However, other ingredients, such as dyes, pigments, antioxidants, solvents, or any other materials that are desirable in the final polymer blend can also be added as components of the conductivity enhancing composition.

It is preferred that the matrix polymer have a viscosity that is about equal to or higher than the viscosity of the conductivity enhancing composition. When the "viscosity" of the matrix polymer or the conductivity enhancing composition is referred to, it is in reference to the viscosity of such material at the conditions to which that material is exposed during blending of the matrix polymer with the conductivity enhancing composition. The "conditions" of blending refer to the parameters of temperature, pressure and shear that the material experiences during blending. It is more preferred that the viscosity of the matrix polymer be higher than the viscosity of the conductivity enhancing composition during blending. While it is more preferred that the viscosity of the matrix polymer be higher, by any amount, than the viscosity of the conductivity enhancing composition, it is even more preferred that the viscosity of the matrix polymer be at least about 10% higher than the viscosity of the conductivity enhancing composition, and it is most preferred that the viscosity of the matrix polymer be at least about 20% higher than the viscosity of the conductivity enhancing composition. As described by Wessling in U.S. Pat. No. 4,929,388, such viscosity difference between two polymeric materials during blending is believed to result in the less viscous polymer forming a continuous interpenetrating network when it is blended with the more viscous polymer. However, it is undesirable that the viscosity of the matrix polymer be extremely high relative to the viscosity of the conductivity enhancing composition (i.e., more than about four times higher), because such extreme difference in viscosity apparently contributes to inadequate shear during mixing between the matrix polymer phase and the conductivity enhancing composition. Such inadequate shear can result in blends having non-optimal conductivity.

The components of the conductivity enhancing composition may be blended together in any manner by which the two polymers and the plasticizer can be intimately mixed. The components can be heated past the softening point of the conductive phase polymer and mixed in a Banbury blender, double lobe blender, sigma mixer, single or double screw extruder, double or triple roll mill, bar mill, ball mill, heated press or any other such blender capable of imparting high shear to the components and obtaining an intimate mixture or fine dispersion of the three components. When the components of the conductivity enhancing composition are to be mixed with a thermoplastic conductive phase polymer as described herein, it is preferred that the mixing step include the application of high shear to the components to be mixed. One preferred method for ensuring high shear mixing is to start with a composition that contains a high percentage of the ICP salt. Preferably the ICP salt comprises from about 40% wt/wt to about 60% wt/wt of the conductivity enhancing composition as initially charged to the mixing apparatus. More dilute compositions are then preferably formulated by making successive dilutions to the initial concentrate until the desired composition of the conductivity enhancing composition is reached. It is also further preferred that the conductivity enhancing composition itself be let down (diluted) into the matrix polymer by a similar step-by-step dilution process.

Alternatively, the components of the composition can be blended by putting each component into solution in a suitable solvent and then mixing the solutions in liquid phase until the components are intimately mixed. The solvents can then be evaporated to yield the solid conductivity enhancing composition.

The relative amounts of the ICP salt, the conductive phase polymer and the plasticizer in the conductivity enhancing composition can vary, but preferably fall within the ranges given below. The amount of each component is expressed as percent by weight of the component based on the total weight of the conductivity enhancing composition. The content of ICP salt in the conductivity enhancing composition preferably is at least about 20%, more preferably at least about 30%, even more preferably at least about 40% and most preferably at least about 50%. The conductive phase polymer is present in the conductivity enhancing composition at a level of about 10% to 70%, preferably about 20% to 60%, more preferably about 30% to 55% and most preferably about 30% to 42%. The plasticizer is present in the conductivity enhancing composition at a level of from about 2% to 35%, preferably at a level of about 4% to 30%, more preferably about 6% to 25% and most preferably about 8% to 20%.

Production Of The Conductive Polymer Blend

The multiple phase electrically conductive polymer blend is produced by blending the matrix polymer with the ICP salt, the conductive phase polymer and the plasticizer. It is preferred, however, that the ICP salt, the conductive phase polymer and the plasticizer be blended into a conductivity enhancing composition as described above before this composition is blended with the matrix polymer. In this manner, a conductivity enhancing composition can be prepared that has a high level of the electrically conductive ICP salt and the ICP salt has an affinity for, and will remain concentrated in, the conductivity enhancing composition during and after blending with the matrix polymer.

Once the conductivity enhancing composition is formed, it can be blended with the matrix polymer to form the multiple phase electrically conductive polymer blend of the invention. This blending step disperses the thermoplastic matrix polymer through the conductivity enhancing composition thereby resulting in the conductivity enhancing composition forming a continuous conductive phase. When it is said that the conductivity enhancing composition forms a "continuous conductive phase", it is meant that the conductivity enhancing composition forms at least one continuous pathway that is available to conduct electron flow through the blend. It is to be recognized that not all of the conductivity enhancing composition has to be included in a continuous pathway and some part of the composition may be present in the blend in the form of discontinuous particles or "dead end" paths. The requirement that the conductivity enhancing composition form a continuous phase does not mean that the matrix polymer can not also form a continuous phase, rather, for the purpose of the invention, the matrix polymer may form either a continuous or discontinuous phase in the blend. The mechanical properties of the blend, however, are enhanced if the matrix polymer also forms a continuous phase. It is preferred that the conductivity enhancing composition and the matrix polymer be co-continuous. It is also to be recognized that during blending, some of the matrix polymer may be blended into the conductivity enhancing composition without materially effecting the ability of that composition to act as the more electrically conductive phase of the blend.

Compared to the method of blending together the components of the conductivity enhancing composition, which is not critical, the method of blending the conductivity enhancing composition with the matrix polymer is key to obtaining the desirable properties of the polymer blend of the invention.

The conductivity enhancing composition must be intermixed thoroughly with the matrix polymer, but can not be overblended or "oversheared" to the extent that the conductivity enhancing composition no longer forms a continuous interpenetrating network within the matrix polymer. By way of example, a Brabender "Plasti Corder", or mixer of similar type, can be used to successfully blend the conductivity enhancing composition and the matrix polymer to the proper consistency by mixing the two components at, for example, 80°–140° C., for about 12 min. at about 100 rpm shaft rotational speed. The polymer blend appears homogeneous on a macroscopic scale, but retains a microscopic continuous, interpenetrating network of the conductivity enhancing composition within the matrix polymer. One of ordinary skill in the art would be able to determine a suitable degree of mixing by routine testing and would be able to identify an overmixed, or "oversheared" polymer blend as one having a significantly lower conductivity than a properly mixed polymer blend.

The relative amounts of the matrix polymer and the conductivity enhancing composition that are used to form the conductive polymer blend of the present invention can vary widely. However, it is usually desirable to use the lowest level of ICP salt in the polymer blend that will result in a conductivity that is appropriate for the application of interest. For that reason, it is often appropriate to carry out a routine test to determine what minimum level of ICP salt in the polymer blend is required. For example, if an antistatic fiber having a conductivity of at least about $10^{-3}$ S/cm is the desired application, a somewhat higher level of ICP salt will be required than if a semi-conductor having a conductivity of about $10^{-5}$ S/cm is the application. In any case, it would be a routine matter for one skilled in the art to determine the required level of ICP salt, and, thus, the amount of conductivity enhancing composition, that must be added to a matrix polymer to obtain the desired level of conductivity.

Although the polymer blend can contain any ratio of matrix polymer-to-conductivity enhancing composition, a preferred composition for the electrically conductive polymer blend of the present invention comprises about 80%–96% wt/wt of the matrix polymer, about 2%–10% wt/wt of the ICP salt, about 0.6%–8% wt/wt of the conductive phase polymer and about 0.2%–4% wt/wt of the plasticizer.

Features and Applications of the Conductive Polymer Blend

An advantageous feature of the multiple phase electrically conductive blends of the present invention is that they provide relatively high levels of conductivity at relatively low levels of ICP salt in the blend. For example one embodiment of the invention provides a polymer blend having a conductivity of at least about $10^{-4}$ S/cm, and preferably of at least about $10^{-3}$ S/cm, when the ICP salt is present in an amount of no higher than about 3.5% by vol. (5% wt/wt) of the polymer blend.

It is desirable for most applications that the mechanical properties of the blend approach those of the neat matrix polymer. For example, it is preferable that the tensile strength of the blend be at least about 60% of that of the neat matrix polymer, and that the elongation ratio be at least about 30% of that of the neat matrix polymer.

The conductive polymer blends of the present invention can be used for any application where an electrically conductive thermoplastic is an appropriate material. For example, fibers that comprise yarns, textiles and carpets are able to dissipate static charge if they are electrically conductive. Materials having conductivities of from $10^{-13}$ to $10^{7}$ S/cm are classed as antistatic materials; those having conductivities of from $10^{-6}$ to $10^{-2}$ S/cm are classed as electric static discharge materials; and those having conductivities of greater than 1.0 S/cm are classed as being suitable for electro-magnetic interference (EMI) shielding materials. (DOD HDISK-263). The blends of the present invention are capable of serving as static discharge materials even when the ICP salt is present in very low levels of 3.5% by vol. or below.

Particularly advantageous features of fibers produced from polymer blends of the present invention are that they retain much of the same tensile properties of the matrix polymer due to the low percolation threshold of the ICP. Moreover, there is no necessity to use activated carbon or other fillers that can bleed out of the fiber and contaminate or interfere with surrounding materials.

Self-standing films and films resulting from the application of liquid or solid paints and coating materials can also include the subject conductive polymer blends. Such films are easily formed from the polymer blends and have the advantage of being clear and translucent unless other optically opaque materials are added. When the subject polymer blends are included in paints and coatings for use on metal surfaces, they have been shown to provide corrosion resistance to the metals.

Due to the ability of the subject polymer blends to be processed without the necessity of evaporating solvents from the materials during formation, they can be used in almost any conventional molding and forming method to form parts that are not limited to films and fibers.

The following examples describe preferred embodiments of the inventions. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

REFERENCE EXAMPLE 1

This illustrates the production of a conductivity enhancing composition containing a polar ICP - Versicon®.

Polyaniline doped primarily with p-toluenesulfonic acid (60 g, Versicon®, available from Monsanto Company, having a surface tension value of about 49 mN/m) was mixed with tris(2-butoxyethyl)phosphate (TBEP) (6 g, from Aldrich) and ethylene carbonate (EC) (12 g, from Aldrich), were mixed by hand on a glass plate. This mixture (35.75 g) was added to ethyl(vinyl acetate) (EVA) (19.25 g, 25% by wt. vinyl acetate, melting index=19, from Aldrich) that had been melted in a Brabender (Plasti Corder) and all components were mixed for 10 min. at 90° C. and 50 rpm. A portion of the material was removed and retained and an amount of EVA equal in weight to the amount of material that had been removed was added to the mixer and the contents of the mixer were re-mixed under the same conditions as above. This procedure was repeated six more times, each time with the addition of more EVA to the material remaining in the mixer. In this manner, a series of eight samples was made with the composition varying according to the amount of EVA that had been added to the mixture The electrical conductivity of each sample was then tested on films formed by hot pressing. In one case the films were formed by pressing at 80° C. under 35,000 psig and in another case films were formed from the same materials by pressing in a 4.25"x4.25"x0.040" mold with a Nordberg Model 118961-S-PD steam press at 177° C. Samples were pressed and held for 5 min. at 120 psig, and then the pressure was raised to 700 psig for 3 min. followed by water cooling. The conductivity was then measured for each film by the four probe method described in "Laboratory Notes On Electrical And Galvanometric Measurements", by H. H. Wieder, Elsevier Scientific Publishing Co., New York, 1979. The polyaniline content and conductivity of each of the samples of the conductivity enhancing composition are shown in Table 1.

TABLE 1

Electrical conductivity of conductivity enhancing compositions containing different levels of Versicon ® blended with ethyl(vinyl acetate) copolymer and pressed into films at two temperatures.

| SAMPLE NO. | VERSICON ® (% vol.) | VERSICON ® (% wt/wt) | CONDUCTIVITY (S/cm) Press @ 80° C. | Press @ 177° C. |
|---|---|---|---|---|
| 1 | 41.1 | 50 | 10.2 | — |
| 2 | 31.7 | 40 | 1.6 | — |
| 3 | 23 | 30 | 1.70E−01 | — |
| 4 | 15.9 | 21.4 | 1.60E−02 | 1.40E−01 |
| 5 | 10.6 | 14.6 | 4.90E−04 | 2.20E−02 |
| 6 | 7.2 | 10 | 5.90E−13 | 7.00E−03 |
| 7 | 3.5 | 5 | 2.40E−14 | 3.90E−09 |
| 8 | 1.9 | 2.6 | 8.60E−15 | — |

The conductivity is plotted versus the polyaniline content in FIG. 1. It can be seen that the percolation threshold for this material is between about 4% by vol. and 9% by vol. and was different for the two pressing temperatures. The higher pressing temperature resulted in a material with a lower percolation threshold. While the reason for this is not known, it is believed that the greater mobility of the Versicon® fraction at the higher pressing temperature may have led to a more efficient chaining of the polyaniline particles in the EVA matrix and, thus, a lower percolation threshold.

REFERENCE EXAMPLE 2

This example illustrates the conductivity of blends of polyaniline with low density polyethylene without the use of a conductive phase polymer to facilitate the formation of an interpenetrating network of the ICP.

Polyaniline doped with p-toluenesulfonic acid (Versicon®, from Monsanto Co.) was mixed with low density polyethylene (LDPE) (type NA-206, from Millenium) in a Brabender mixer at a temperature of 90° C. for 10 min.

The conductivity of Versicon®/LDPE blends containing 5%, 7.5%, 10%, 20% and 50% wt/wt Versicon® was measured by the four probe method. The conductivities, respectively, were: $1\times10^{-12}$, $1\times10^{-12}$, $1\times10^{-12}$, 0.066 and 4.12 S/cm. The data for conductivity were plotted versus weight percent Versicon® in the blend in FIG. 2, and show that percolation is reached at a polyaniline level in the blend of somewhere between 10% and 20% wt/wt. At a level of 5% wt/wt Versicon®, the conductivity of the composition is still lower than $10^{-}$ S/cm.

This percolation point is somewhat higher than that determined by Shacklette et al., in *Synth. Met.*, 55–57:3532–3537, 1993, where percolation points for Versicon® in PETG and PCL blends (without any other polymers) of about 5% by volume (about 7% wt/wt) were found. The authors of that reference surmised that Versicon® particles aggregate into some form of network and thus reduced the percolation point below the theoretical 15%–30% expected for small spheres. It was reported that the small particle size of Versicon® "primary particles" permits this aggregation when mixed with an "incompatible" polymer. "Incompatible" was defined as a mismatch in surface energy or a mismatch in solubility parameter, but there was no speculation as to why such aggregated structures form, or how their formation could be facilitated or controlled.

EXAMPLE 1

This illustrates the conductivity of a blend of polyethylene with Versicon® and EVA and shows how the selection of an ICP and conductive phase polymer according to the present invention reduces the percolation threshold.

Polyaniline doped with p-toluenesulfonic acid (120 g, Versicon®) was mixed with TBEP (12 g) and ethylene carbonate (24 g). The polyaniline/plasticizer mixture was mixed by hand as described in Reference Example 1. Ethyl(vinyl acetate) (19.2 g, 25% wt/wt vinyl acetate, melt index 19, from Aldrich) was melted in a Brabender (Plasti Corder) and the polyaniline/plasticizer mixture (35.8 g) was added and the contents were mixed for 12 min. at 80° C. at 100 rpm to form the conductivity enhancing compositions (CEC). The final temperature was about 150° C. Blends containing different levels of Versicon® were prepared by adding low density polyethylene (LDPE, NA 206, from Millennium) and mixing the blends as described above. Seven blends having different levels of Versicon® in LDPE were prepared from the CEC. Samples of the conductivity enhancing compositions (Versicon®, conductive phase polymer and plasticizer) and each of the blends with LDPE were pressed into films as described in Reference Example 1 and the conductivity of each film was measured by the four probe method. Table 2 shows the conductivities and compositions of each of the samples.

TABLE 2

Conductivity of blends of Versicon ® with low density polyethylene and ethyl(vinyl acetate) at different levels of Versicon ®.

| SAMPLE NO. | VERSICON ® (% vol.) | VERSICON ® (% wt/wt) | CONDUCTIVITY (S/cm) |
|---|---|---|---|
| 1 | 41.1 | 50 (CEC) | 15 |
| 2 | 14.8 | 20 | 1.50E+00 |
| 3 | 7.2 | 15 | 8.20E−01 |
| 4 | 5.7 | 10 | 3.70E−01 |
| 5 | 3.5 | 7.5 | 1.60E−01 |

TABLE 2-continued

Conductivity of blends of Versicon ® with low density polyethylene and ethyl(vinyl acetate) at different levels of Versicon ®.

| SAMPLE NO. | VERSICON ® (% vol.) | VERSICON ® (% wt/wt) | CONDUCTIVITY (S/cm) |
|---|---|---|---|
| 6 | 1.8 | 5 | 3.00E−02 |
| 7 | 0.21 | 2.5 | less than 10–12 |

Figure 3:
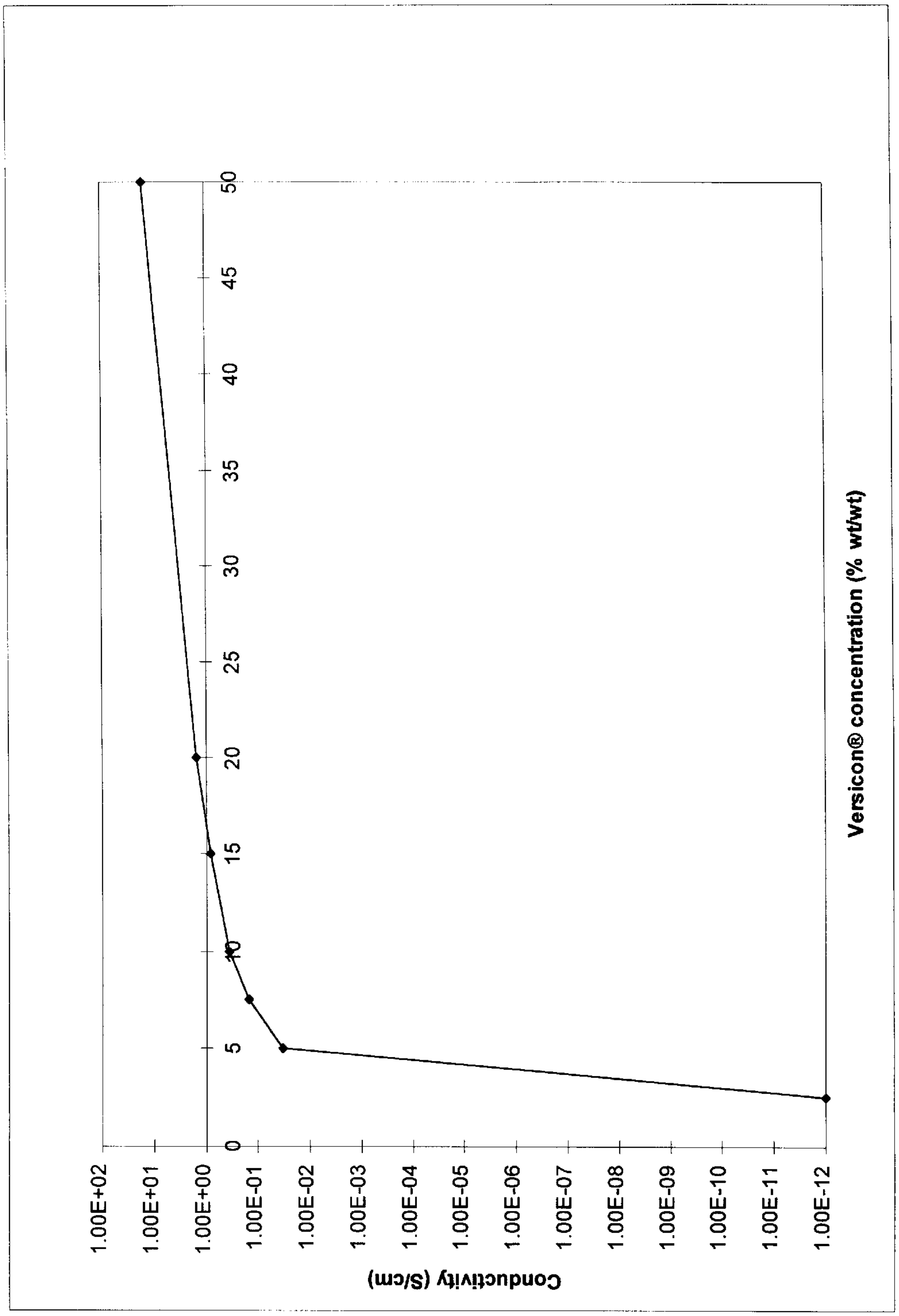
FIG. 3 shows the electrical conductivity of a film pressed from a blend of low density polyethylene with a conductivity enhancing composition (Versicon® with ethyl(vinyl acetate) copolymer and low levels of tris(2-butoxyethyl) phosphate and ethylene carbonate), as a function of the level of Versicon® in the blend.

A plot of the conductivity versus volume percent Versicon® in the blend is shown in FIG. 3 and indicates a percolation threshold of between 2.5% and 5% by wt. (2%–3.6% by vol.) Versicon®.

Figure 4:
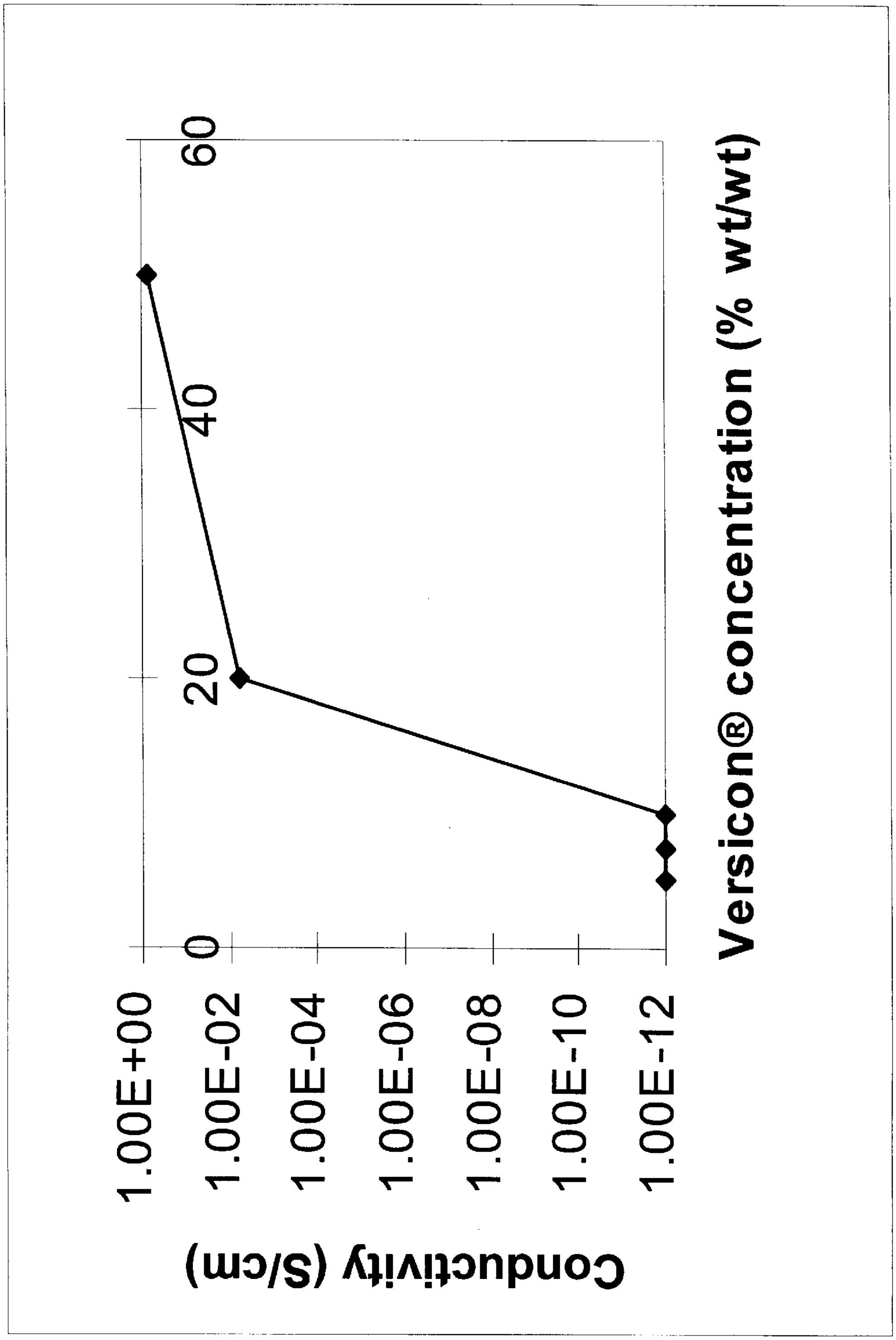
FIG. 4 shows the electrical conductivity of a film pressed from a blend of low density polyethylene with Versicon® and low levels of tris(2-butoxyethyl) phosphate and ethylene carbonate), as a function of the level of Versicon® in the blend.

Two more sets of blends were made at varying levels of Versicon® using the same ingredients as described above except that in one case the EVA was excluded from the conductivity enhancing composition and in another case both the EVA and the plasticizers were excluded (in other words, the LDPE was blended with Versicon® alone as in Reference Example 2). The conductivities of these blends were measured and plotted versus the concentration of Versicon® in the blends in FIG. 2 (for the blend excluding both plasticizers and EVA) and FIG. 4 (for the blend excluding EVA). Compared with the conductivity of a 5% wt/wt Versicon® blend with LDPE, but without the EVA and plasticizer, as shown FIG. 2, addition of the EVA and plasticizer results in the blend of the present invention having a conductivity that is higher by about ten orders of magnitude Thus, it is obvious that addition of the EVA and plasticizer significantly reduce the percolation threshold of the blend versus the same blend without the conductive phase polymer and plasticizer. It is believed that the polar polyaniline salt (Versicon®) blended with a conductive phase polymer having both polar and nonpolar characteristics (EVA) and plasticizers that compatibilize the Versicon® and the EVA, facilitates the formation of an interpenetrating network of the polyaniline when the conductivity enhancing composition is blended with the non-polar polyethylene and reduces the percolation threshold based on the amount of polyaniline used.

Figure 2:
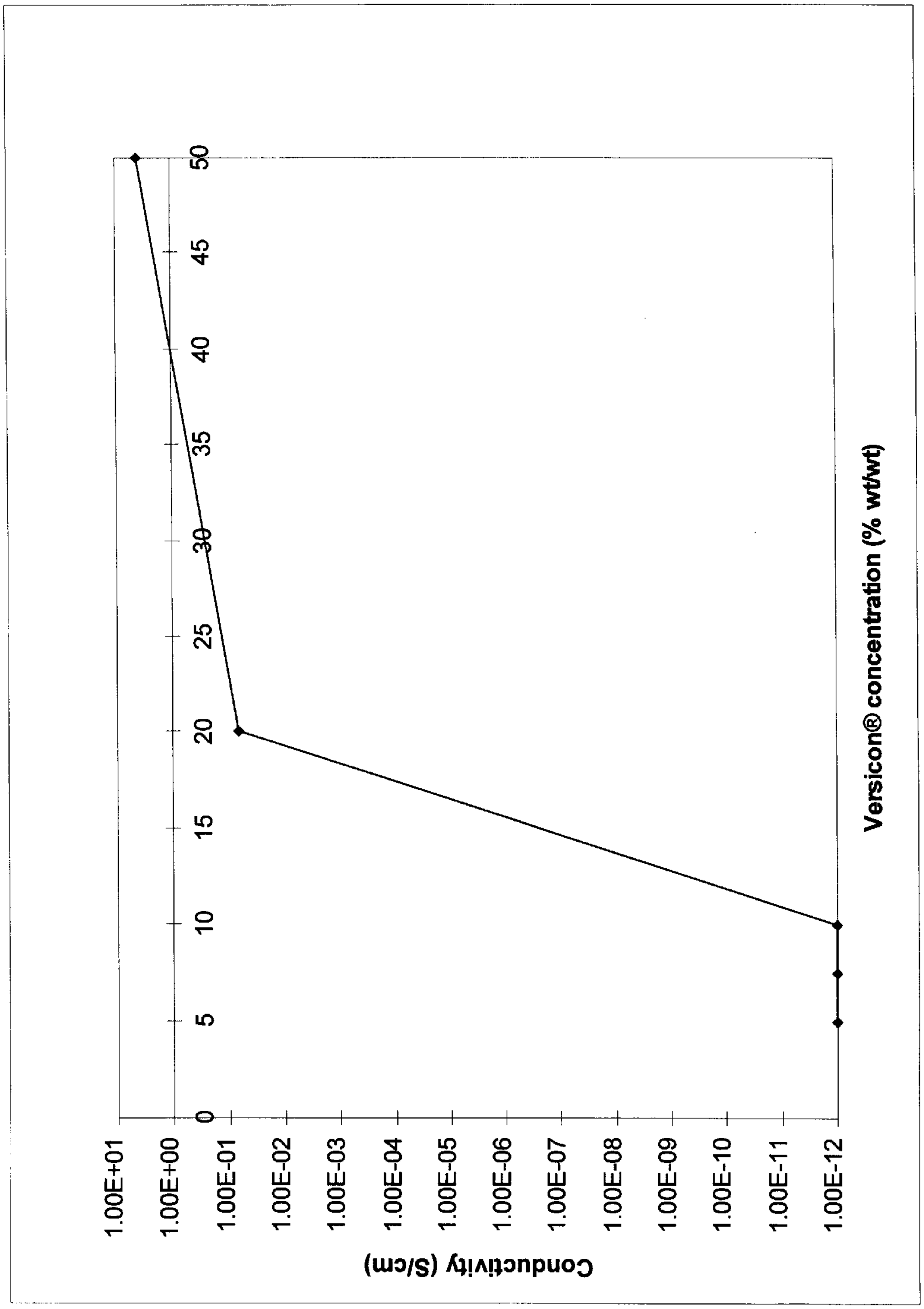
FIG. 2 shows the electrical conductivity of a film pressed from a blend of low density polyethylene with Versicon® as a function of the level of Versicon® in the blend.

Comparison of FIGS. 2 and 3 shows that the presence of the EVA is an important factor in insuring that the conductivity enhancing composition fulfill its role of decreasing the percolation threshold of the blend. The addition of the plasticizers to the Versicon®, but without the EVA, did not reduce the percolation threshold.

Blends containing Versicon®, EVA and LDPE were conditioned in a conditioning room for 20 hours at a temperature of 25° C. and 50% relative humidity. Pure LDPE and samples of blends containing from 7.5% wt/wt to 20% wt/wt Versicon® were then pressed into specimens and cut into dumbbells of 1" length, 0.123" width and known thickness. Tensile strength and elongation measurements were carried out on a MTS Sintech tensile testing machine. The tensile strength (in lb/sq.in.) and elongation (in % elongation) were measured at the breaking point of the specimen. The results are shown in Table 3.

TABLE 3

| Mechanical properties of Versicon ®/ethyl(vinyl acetate)/low density polyethylene blends. | | |
|---|---|---|
| VERSICON CONTENT OF BLEND (wt. %) | TENSILE STRENGTH at Break (PSI) | ELONGATEON at Break (%) |
| 0 (pure LDPE) | 14,400 | 295 |
| 7.5 | 12,300 | 155 |
| 10 | 11,600 | 105 |
| 15 | 10,600 | 100 |
| 20 | 12,100 | 85 |

Figure 5:
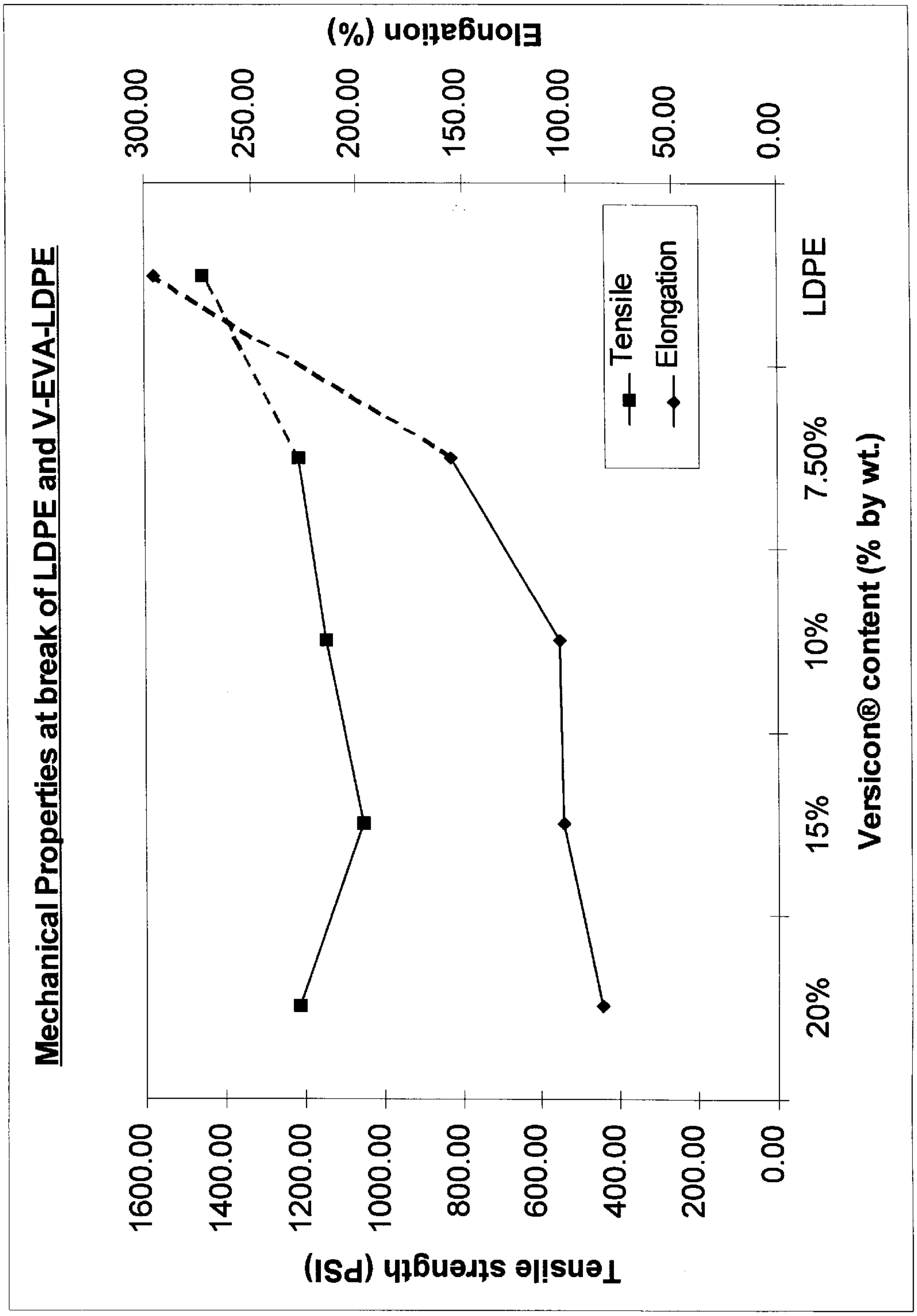
FIG. 5 is a plot of the tensile strength and percent elongation of a blend of low density polyethylene with a conductivity enhancing composition that contains Versicon® with ethyl(vinyl acetate) copolymer and low levels of tris(2-butoxyethyl) phosphate and ethylene carbonate, as a function of the level of Versicon® in the blend.

Tensile strength and elongation at breaking are plotted versus the weight percent Versicon® in the sample in FIG. 5. From this plot it can be seen that addition of the Versicon® effects the breaking tensile strength of the matrix polymer only moderately, but the elongation of the pure LDPE is reduced by about one-third upon the addition of about 10% to 15% wt/wt of the polyaniline.

EXAMPLE 2

This illustrates the conductivity of polypropylene blended with Versicon® and EVA.

Figure 6:
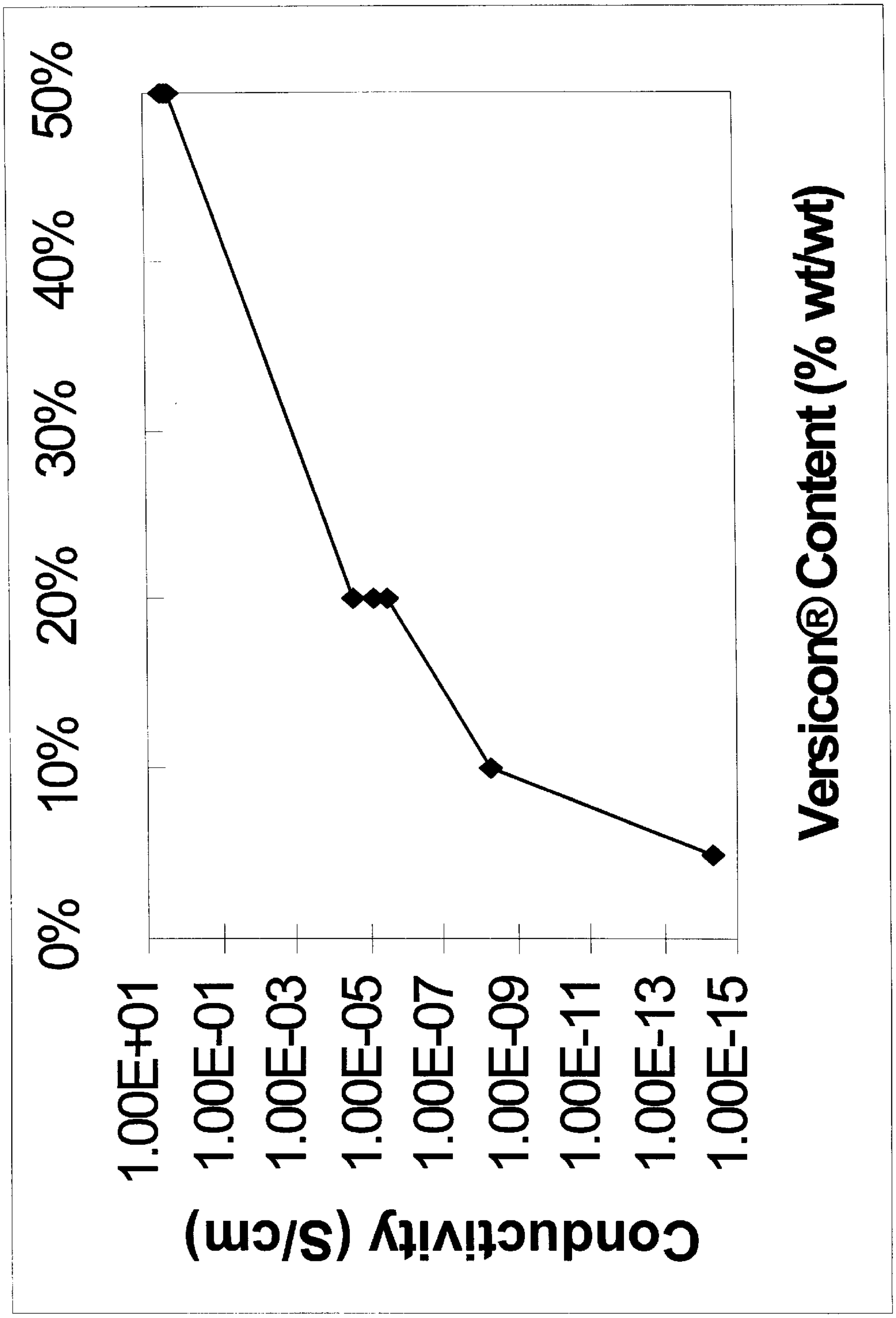
FIG. 6 shows electrical conductivity of a film pressed from a blend of polypropylene with a conductivity enhancing composition that contains Versicon® with ethyl(vinyl acetate) copolymer and low levels of tris(2-butoxyethyl) phosphate and ethylene carbonate, as a function of the level of Versicon® in the blend.

Blends of the Versicon®/EVA/TBEP conductivity enhancing composition were prepared and blended by the methods described in Example 1 and the composition was blended with polypropylene (type CO40y polypropylene, available from Aristech) rather than LDPE. The ethylvinylacetate copolymer contained 25% vinyl acetate and had a melt index of 19, and was obtained from Aldrich. Samples were prepared of blends containing different amounts of Versicon® and conductivity was measured by the four probe method. The conductivities are plotted versus the volume percent Versicon® in the blend in FIG. 6 and show that, in general, the conductivities of the polypropylene blends were lower then those of the LDPE blends at similar levels of Versicon®.

A second blend of Versicon®/EVA/TBEP was prepared as described above except that the EVA was supplied by Aldrich and had a vinyl acetate content of 25% and a melt index of 57. The resulting conductivity enhancing composition was blended with a different polypropylene (type D-180-A, available from Aristech, having a melt index of 19). At a level of 10% Versicon® wt/wt, the conductivity of this second polypropylene blend was $3\times10^{-2}$ S/cm, versus the conductivity of the first polypropylene blend at the same level of Versicon® of about $5.5\times10^{-9}$ S/cm. This difference in conductivity at the same Versicon® level illustrates the effect of the viscosity differences between the matrix polymer and the conductivity enhancing composition. Here, the polypropylene blend with the conductivity enhancing composition (CEC) with the lower melt viscosity (the higher melt index) resulted in the higher conductivity. This is ascribed to the formation of a more clearly defined conductive phase by the CEC with the matrix polymer/CEC blend having the largest differential in melt viscosity.

EXAMPLE 3

Illustration of a blend of Versicon® in a conductivity enhancing composition with polystyrene.

A conductivity enhancing composition (CEC) containing Versicon®, EVA and TBEP and ethylene carbonate plasticizers was mixed as described in Example 1. Portions of this CEC were then blended with polystyrene (available as Styron 663 from Dow Chemical Co.) so that the Versicon® was present at 10% wt/wt and 20% wt/wt. The blends with polystyrene were made at 160° C., 170° C. and 190° C. The electrical conductivity of each of the resulting blends was measured as described in Reference Example 1 and the results are shown in Table 4.

TABLE 4

| ELECTRICAL CONDUCTIVITY OF BLENDS OF VERSICON ®/EVA/POLYSTYRENE AS A FUNCTION OF VERSICON ® CONCENTRATION AND PROCESSING TEMPERATURE | | |
|---|---|---|
| VERSICON ® CONCENTRATION (% wt/wt) | PROCESSING TEMPERATURE (°C.) | ELECTRICAL CONDUCTIVITY (S/cm) |
| 10 | 160 | 0.0012 |
| 10 | 170 | 0.0008 |
| 10 | 190 | 0.0002 |
| 20 | 160 | 0.061 |
| 20 | 170 | 0.062 |
| 20 | 190 | 0.0013 |

The results show that a conductive blend is produced with the polystyrene at both 10% and 20% wt/wt ICP concentrations and that the conductivity is somewhat effected by processing temperature. In both cases, the highest conductivity of the blends occurred in the blends which had experienced the lowest blending temperature, while the lowest conductivity occurred in the blends which had experienced the highest blending temperature. It is not known whether this difference was caused by changes in the relative viscosity properties of the polymers during blending, or was due to thermal damage to the ICP.

EXAMPLE 4

This example reports polyethylene blended with Versicon® and several different EVA's and illustrates the combined effect of both melt index of the conductive phase polymer and vinyl acetate content of the EVA on conductivity of the blends.

Blends of polyethylene with Versicon®, EVA, TBEP and ethylene carbonate were prepared as described in Example 1, except that blends were prepared from three different EVA's. Three EVA's, each having a different melt index and vinyl acetate content, were obtained from Aldrich and Millennium. The vinyl acetate content and melt index of each of the EVA's is shown in Table 5.

TABLE 5

| Types and properties of ethyl(vinyl acetate) polymer used in conductivity enhancing compositions | | |
|---|---|---|
| TYPE OF ETHYL(VINYL ACETATE) | VINYL ACETATE CONTENT (wt. %) | MELT INDEX |
| Aldrich | 25% | 19 |
| UE 652 | 19% | 32 |
| UETR 230 | 15% | 26 |

The melt index is a function of the viscosity of the EVA at a specific temperature, pressure and rate of shear and represents the number of grams of polymer that can be forced through a small orifice in a certain time at a certain temperature and pressure. Thus, the higher the melt index, the lower the viscosity of the polymer under those conditions of temperature and pressure. The vinyl acetate (VA)

content of the EVA is indicative of the relative polarity of the polymer. In general, the higher the VA content of the EVA, the more polar is the EVA. Nonetheless, each of the EVA's also retains certain non-polar character contributed by the ethylene moieties.

Films were prepared for blends containing each of the EVA's at Versicon® levels of from 5% to 20% wt/wt and conductivity was measured as described in Example 1. Table 6 shows the conductivity of LDPE blends with conductivity enhancing compositions made up from each of the three EVA's.

TABLE 6

Conductivity of blends of Versicon ® ethyl(vinyl acetate)/low density polyethylene with three types of ethyl(vinyl acetate).

| VERSECON CONTENT | CONDUCTIVITY (S/cm) | | |
|---|---|---|---|
| OF BLEND (wt. %) | ALDRICH | UE 652 | UETR 230 |
| 5% | 3.38E−02 | 2.13E−02 | |
| 7.50% | 1.60E−01 | 8.58E−02 | 4.48E−02 |
| 10% | 3.70E−01 | 1.97E−01 | 1.35E−01 |
| 15% | 8.20E−01 | 5.98E−01 | 4.58E−01 |
| 20% | 1.5 | 1.13 | 9.02E−01 |

Figure 7:
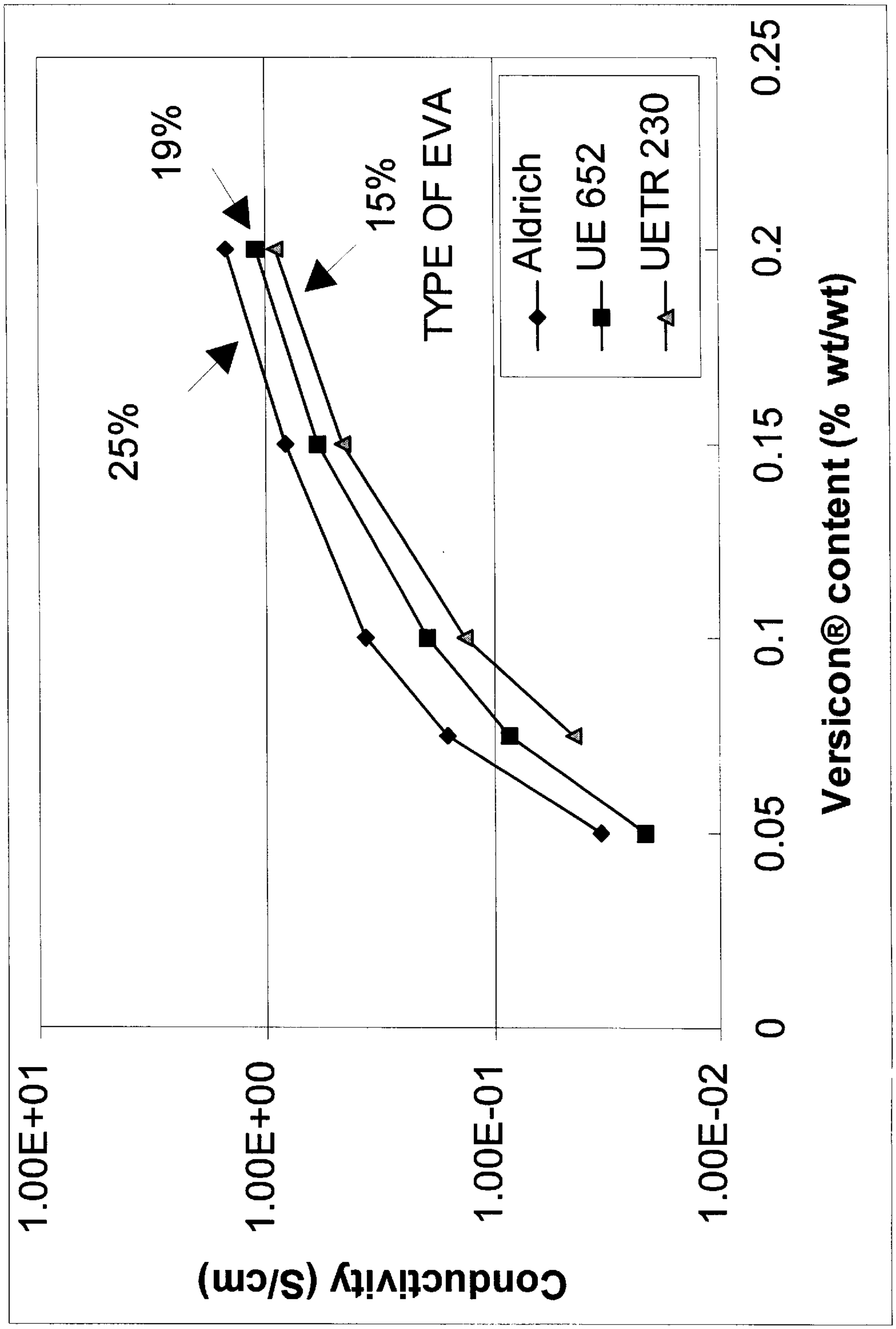
FIG. 7 shows the electrical conductivity of films pressed from blends of low density polyethylene with three different conductivity enhancing compositions (each containing Versicon® and low levels of tris(2-butoxyethyl) phosphate and ethylene carbonate with ethyl(vinyl acetate) copolymer from Aldrich, UETR 230, or UE 652), as a function of the level of Versicon® in the blends.

The conductivity data from Table 6 is plotted versus the weight percent Versicon® in the blend in FIG. 7. The data indicate that the vinyl acetate (VA) content of the EVA is a correlating factor for the conductivity and that, at the same level of Versicon®, EVA with higher VA level results in higher conductivity This is believed to be due to the increased affinity of the polar Versicon® for the EVA having the most polar characteristic (the Aldrich EVA). Thus, at any given level of the conductivity enhancing composition in the blend, the EVA that retains the highest level of Versicon® in the conductive phase results in a blend with the highest conductivity.

The plotted data also show that the melt viscosity of the conductive phase polymer does not seem to be a correlating parameter for conductivity in blends with polyaniline salts. The conductivity of the blend containing EVA having the lowest melt viscosity (the UE 652) falls between the conductivities of the EVA's having the highest (the Aldrich) and medium level (UETR 230) melt viscosities. Thus, as long as the melt viscosity of the conductive phase polymer is about equal to or preferably lower than that of the matrix polymer, melt viscosity of the conductive phase polymer does not seem to be a controlling parameter for obtaining increased conductivity in blends with polyaniline salts. Very low melt viscosity for the EVA should be avoided, however, since such a circumstance can reduce the shear created during the mixing of the CEC to the point where insufficient dispersion of the ICP salt is obtained.

EXAMPLE 5

This illustrates the effect of the concentration of EVA in the conductivity enhancing composition upon the conductivity of blends with LDPE.

Figure 8:
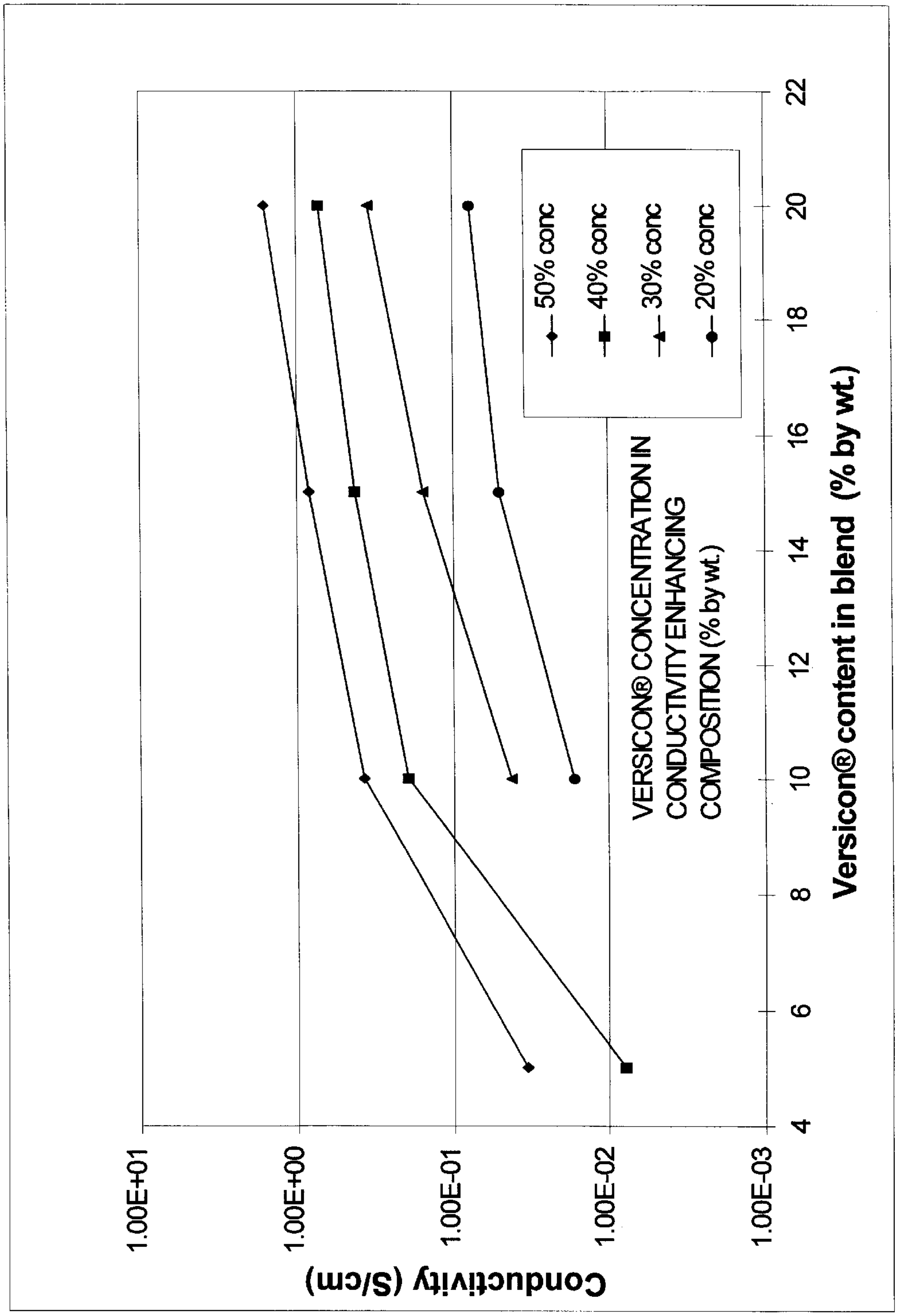
FIG. 8 is a plot of electrical conductivity of films pressed from blends of low density polyethylene with four different conductivity enhancing compositions as a function of Versicon® levels in the blends, where the conductivity enhancing compositions contain ethyl(vinyl acetate) copolymer and low levels of tris(2-butoxyethyl) phosphate and ethylene carbonate, with Versicon® initially present at four different levels in the conductivity enhancing composition.

Blends of the Versicon®/EVA/TBEP conductivity enhancing composition were prepared and blended by the methods described in Example 1. Samples of the conductivity enhancing composition (CEC) were prepared with levels of Versicon® of 50%, 40%, 30% and 20% wt/wt, starting at the highest level of Versicon® (50%) and sequentially diluting with EVA to obtain compositions with less than 50% wt/wt Versicon®. Each of these compositions was blended with low density polyethylene (LDPE, type NA 206, available from Millennium) to give polymer blends having 5%, 10%, 15% or 20% wt/wt levels of Versicon® in the final blend. Samples were prepared by hot pressing at 177° C. and 140 psig for six minutes and the conductivity was measured by the four probe method. The conductivities were plotted versus the weight percent Versicon® as shown in FIG. 8. The results show that, as expected, higher Versicon® levels give higher conductivities, but, surprisingly, that the more concentrated the polyaniline is in the conductive phase, the higher the conductivity, even at significantly lower overall levels of Versicon®. It is believed that this can be explained conceptually by the fact that although the "strands" of the interpenetrating network of the conductive phase may be thinner, due to lower amounts of the CEC in the blend, they are better conductors because they have a higher concentration of polyaniline.

REFERENCE EXAMPLE 3

This illustrates a blend with LDPE as the matrix polymer and having an LDPE of higher melt index as the conductive phase polymer.

Figure 9:
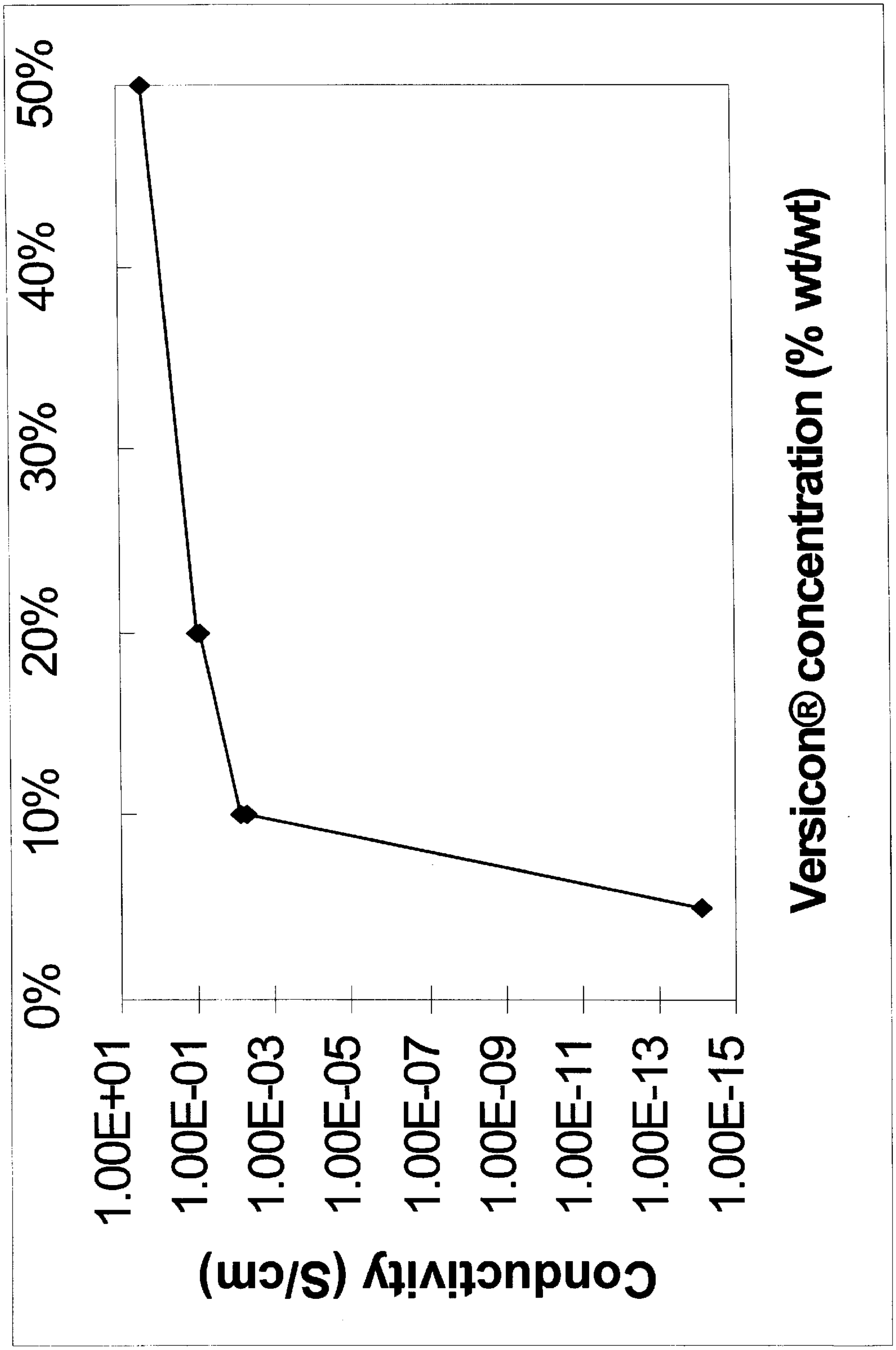
FIG. 9 is a plot of electrical conductivity of films pressed from blends of low density polyethylene with a mixture of a different low density polyethylene that had been blended with Versicon® and low levels of tris(2-butoxyethyl) phosphate and ethylene carbonate, where the conductivity is plotted versus the Versicon® concentration of the blends.

A conductivity enhancing composition was blended as described in Example 1, except that low density polyethylene (NA 249, melt index=55; available from Millennium Company) was substituted for EVA. This CEC was then blended with another low density polyethylene (NA 204; also available from Millennium Co.) that had a lower melt index (melt index=19) to give blends having Versicon® concentrations of from 5% to 50% wt/wt. The conductivity of each of the blends was measured by the method described in Reference Example 1 and the conductivity is plotted versus the Versicon® concentration as shown in FIG. 9. When the percolation curves of FIG. 9 are compared versus FIG. 3, for example, where EVA is the conductive phase polymer, it is apparent that EVA is superior to LDPE as the conductive phase polymer even when the LDPE used in the CEC and the matrix polymer have different melt indices. It is believed that the superior properties of the blend that contains EVA as the conductive phase polymer are the result of the compatibility properties of the several ingredients of the blend as previously described.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A method for preparation of a multiple phase electrically conductive polymer blend wherein an electrically insulative thermoplastic matrix polymer phase is dispersed through a continuous conductive phase of a conductivity enhancing composition, the method comprising blending the conductivity enhancing composition with an electrically insulative thermoplastic matrix polymer of about equal or higher viscosity, the conductivity enhancing composition comprising (i) an intrinsically conductive polymer salt that is incompatible with the matrix polymer and has an affinity for the conductivity enhancing composition relative to the matrix polymer, (ii) a thermoplastic conductive phase polymer that is partially compatible with both the matrix polymer and the intrinsically conductive polymer salt, and (iii) a plasticizer that is at least partially compatible with the conductive phase polymer and the intrinsically conductive polymer salt, thereby to form a multiple phase electrically conductive polymer blend wherein the matrix polymer phase is dispersed through a continuous conductive phase of the conductivity enhancing composition.

2. A method as set forth in claim 1, wherein the viscosity of the matrix polymer is higher than the viscosity of the conductive phase polymer.

3. A method as set forth in claim 1, wherein said intrinsically conductive polymer is selected from a polyaniline, a polypyrrole, or a polythiophene.

4. A method as set forth in claim 3, wherein said intrinsically conductive polymer is a polyaniline.

5. A method as set forth in claim 4, wherein, when the matrix polymer is non-polar, said intrinsically conductive polymer salt is a polar polyaniline salt.

6. A method as set forth in claim 5, wherein said polar polyaniline salt is the para-toluenesulfonic acid salt of polyaniline or the dodecylbenzenesulfonic acid salt of polyaniline.

7. A method as set forth in claim 6, wherein the matrix polymer is selected from polyethylene or polypropylene.

8. A method as set forth in claim 6, wherein said intrinsically conductive polymer salt is the para-toluenesulfonic acid salt of polyaniline.

9. A method as set forth in claim 8, wherein said para-toluene sulfonic acid salt of polyaniline is added in an amount that comprises at least about 50% wt/wt of the conductivity enhancing composition.

10. A method as set forth in claim 7, wherein the conductive phase polymer is selected from ethyl(vinyl acetate) copolymer, ethylene methacrylate or maleated polypropylene.

11. A method as set forth in claim 10, wherein the conductive phase polymer is selected from ethyl(vinyl acetate) copolymer.

12. A method as set forth in claim 11, wherein vinyl acetate monomer units comprise at least about 20% of the total monomer units making up the ethyl(vinyl acetate) copolymer.

13. A method as set forth in claim 5, wherein, when the matrix polymer is polar, said intrinsically conductive polymer salt is the dinonylnaphthalenesulfonic acid salt of polyaniline.

14. A method as set forth in claim 13, wherein the conductive phase polymer is selected from ethyl(vinyl acetate) copolymer, ethylene methacrylate or maleated polypropylene.

15. A method as set forth in claim 5, wherein the plasticizer is selected from a sulfonamide, ethylene carbonate, or tris-butoxyethyl phosphate.

16. A method as set forth in claim 15, wherein the plasticizer comprises ethylene carbonate and trisbutoxyethyl phosphate.

17. A method as set forth in claim 1, wherein the conductivity of the polymer blend is at least about $10^{-4}$ S/cm when said intrinsically conductive polymer salt is present in an amount of no higher than about 5% wt/wt of the polymer blend.

18. A method as set forth in claim 1, wherein the matrix polymer has a softening point no higher than about 300° C.

19. A method as set forth in claim 1, wherein the matrix polymer has a softening point no higher than about 250° C.

20. A method as set forth in claim 1, wherein the polymer blend has tensile properties suitable for the fabrication of textile fibers.

21. A multiple phase electrically conductive polymer blend, comprising an electrically insulative thermoplastic matrix polymer dispersed through a continuous conductive phase that includes an intrinsically conductive polymer salt that is incompatible with the matrix polymer, a thermoplastic conductive phase polymer that is partially compatible with both the intrinsically conductive polymer salt and the matrix polymer and a plasticizer that is capable of compatibilizing the conductive phase polymer and the intrinsically conductive polymer salt, wherein the intrinsically conductive polymer salt is concentrated in the conductive phase.

22. A polymer blend as set forth in claim 21, wherein said intrinsically conductive polymer is selected from polyaniline, polypyrrole, or polythiophene.

23. A polymer blend as set forth in claim 22, wherein said intrinsically conductive polymer is polyaniline.

24. A polymer blend as set forth in claim 23, wherein, when the matrix polymer is non-polar, said intrinsically conductive polymer salt is the para-toluenesulfonic acid salt of polyaniline or the dodecylbenzenesulfonic acid salt of polyaniline.

25. A polymer blend as set forth in claim 24, wherein the matrix polymer is selected from polyethylene or polypropylene.

26. A polymer blend as set forth in claim 24, wherein said intrinsically conductive polymer salt is the para-toluenesulfonic acid salt of polyaniline.

27. A polymer blend as set forth in claim 26, wherein the conductive phase polymer is selected from ethyl(vinyl acetate) copolymer, ethylene methacrylate or maleated polypropylene.

28. A polymer blend as set forth in claim 27, wherein the conductive phase polymer is ethyl(vinyl acetate) copolymer.

29. A polymer blend as set forth in claim 28, wherein vinyl acetate monomer units comprise at least about 20% of the total monomer units making up the copolymer.

30. A polymer blend as set forth in claim 23, wherein, when the matrix polymer is polar, said intrinsically conductive polymer salt is the dinonylnaphthalenesulfonic acid salt of polyaniline.

31. A polymer blend as set forth in claim 23, wherein the plasticizer is selected from a sulfonamide or tris-butoxyethyl phosphate.

32. A polymer blend as set forth in claim 28, wherein the matrix polymer is polyethylene.

33. A polymer blend as set forth in claim 22, wherein the conductivity of the polymer blend is at least about $10^{-4}$ S/cm when said intrinsically conductive polymer salt is present in an amount of no higher than about 5% wt/wt of the polymer blend.

34. A polymer blend as set forth in claim 22, wherein the matrix polymer has a softening point no higher than about 300° C.

35. A polymer blend as set forth in claim 22, wherein the matrix polymer has a softening point no higher than about 250° C.

36. A polymer blend as set forth in claim 22, wherein the polymer blend has tensile properties suitable for the fabrication of textile fibers.

37. A polymer blend as set forth in claim 21, wherein the polymer blend comprises about 80%–96% wt/wt of the matrix polymer, about 2%–10% wt/wt of the intrinsically conductive polymer salt, about 0.6%–8% wt/wt of the conductive phase polymer and about 0.2%–4% wt/wt of the plasticizer.

* * * * *